(12) United States Patent
Medge

(10) Patent No.: US 10,576,861 B1
(45) Date of Patent: Mar. 3, 2020

(54) WHIPLASH INJURIES PREVENTION HEADREST APPARATUS AND DROWSY DRIVING PREVENTION ALARM

(71) Applicant: Igor Medge, Sunny Isles Beach, FL (US)

(72) Inventor: Igor Medge, Sunny Isles Beach, FL (US)

( * ) Notice: Subject to any disclaimer, the term of this patent is extended or adjusted under 35 U.S.C. 154(b) by 62 days.

(21) Appl. No.: 15/732,387

(22) Filed: Nov. 3, 2017

(51) Int. Cl.
| | |
|---|---|
| *B60N 2/888* | (2018.01) |
| *B60N 2/882* | (2018.01) |
| *B60N 2/885* | (2018.01) |
| *B60N 2/80* | (2018.01) |

(52) U.S. Cl.
CPC ............. *B60N 2/888* (2018.02); *B60N 2/882* (2018.02); *B60N 2/885* (2018.02); *B60N 2002/899* (2018.02)

(58) Field of Classification Search
None
See application file for complete search history.

(56) References Cited

U.S. PATENT DOCUMENTS

| | | | | |
|---|---|---|---|---|
| 4,592,523 A * | 6/1986 | Herndon | ................ | B64D 25/02 |
| | | | | 244/122 AG |
| 6,863,343 B2 * | 3/2005 | Pal | ........................ | B60N 2/865 |
| | | | | 297/216.12 |
| 7,048,334 B2 * | 5/2006 | Pal | ....................... | B60N 2/4279 |
| | | | | 297/216.12 |
| 2004/0000807 A1 * | 1/2004 | Pal | ........................ | B60N 2/865 |
| | | | | 297/391 |
| 2017/0197529 A1 * | 7/2017 | Hontz | ................ | B64D 11/0646 |
| 2018/0056833 A1 * | 3/2018 | Kuhne | .................... | B60N 2/885 |
| 2018/0297550 A1 * | 10/2018 | Kitagawa | .............. | B60R 21/237 |

* cited by examiner

*Primary Examiner* — David E Allred
(74) *Attorney, Agent, or Firm* — Frank L. Kubler

(57) ABSTRACT

A headrest apparatus for securing to a backrest of a seat such as a vehicle seat includes a headrest framework with generally parallel and spaced apart first and second side frames and a side frame connecting structure holding the side frames upright, and including a sheet assembly fitted to and suspended generally horizontally between and the first and second side frames above the seat backrest for supporting a user head.

17 Claims, 34 Drawing Sheets

10,576,861 B1

WHIPLASH INJURIES PREVENTION HEADREST APPARATUS AND DROWSY DRIVING PREVENTION ALARM

FILING HISTORY

This application continues from provisional patent application Ser. No. 62/497,102, filed on Nov. 9, 2016.

BACKGROUND OF THE INVENTION

1. Field of the Invention

The present invention relates generally to the fields of chairs and headrests, and to the prevention of whiplash injuries and drowsy driving. More specifically the present invention relates to a headrest apparatus such as for mounting to the top of a backrest of a seat, such as a car seat, an office chair or a dental chair, which prevents or reduces the severity of a whiplash injury, providing comfort for the neck and head of the user as well as preventing drowsy operation of vehicles and other moving machinery and equipment.

According to the National Sleep Foundation's 2005 poll, "60% of adult drivers (about 168 million people) say they have driven a vehicle while feeling drowsy and 37% (or 103 million people), have actually fallen asleep at the wheel". The National Highway Traffic Safety Administration (NHTSA) conservatively estimates that "100,000 annually police-reported crashes are the direct result of driver fatigue (which results in drowsy driving). This results in an estimated $12.5 billion in monetary losses, 1,550 deaths and 71,000 injuries (including whiplash injuries)".

Whiplash is the most common injury from a rear-end collisions. The term "whiplash" is used to describe injuries characterized by a sudden distortion of the spine. "Such injuries can lead to long, painful and debilitating symptoms over many years. Whiplash injuries are difficult to diagnose and difficult to treat. While such crashes rarely result in fatalities, the consequences of whiplash injuries have a huge impact on individuals and on society, with an estimated annual cost of some €10 billion in Europe" according to European New Car Assessment Programme (Euro NCAP). According to 2013 figures of NHTSA, "out of the 6 million car accidents that happen on U.S. roads every year, over 40% of them (2.5 million) are rear end collisions", which was is the most common type of auto accident in the U.S. in 2003. The Insurance Research Council reported that, with an average cost of whiplash injury claim near $5,000, "the total cost for crashes (that result in nothing more serious than whiplash) is $8.2 billion, and this accounts for 25 percent of all crash injury claims dollars paid by insurers". These substantial economic costs are in addition to the emotional and social costs of the pain and suffering.

In order to reduce the severity of whiplash injuries, Federal Safety Regulations since 2009 has required that head restraints be positioned so that they provide a distance from the back of the driver's head to the head restraint of 2.2 inches or less. However, J.D. Power and Associates reports that, in 2011, "new-vehicle owners have had more problems with the headrest adjustment controls than with any other part of car seats". Drivers and passengers very rarely (in fact almost never) properly adjust headrests prior to a trip, so that in most vehicles, the back of the driver's head is still positioned forward of the headrest well over the required maximum of 2.2 inches.

Studies of the rear-end collisions timeline show that from the moment of impact, the car that is struck, and the torso, head and neck of the driver are not starting the forward movement simultaneously. Instead, they start moving in a certain sequence. First, the struck car moves forward, but driver's body continues to stay in its initial position. After a short delay the car seat starts pushing the driver's torso forward underneath the driver's head, which remains motionless for a few more milliseconds (because nothing is pushing it yet). Then, the driver's head starts moving rearward relatively to the torso until it is harshly stopped as a result of impact with the headrest.

The muscles in the front of the driver's neck first contract about 100 ms (milliseconds) after the moment of impact (which is 25 ms too late to prevent ligament or muscle damage) and then reach their peak stretch at about at about 150 ms. The muscles in the back of the neck start contracting soon thereafter but around the 300 ms point are injured more than the muscles in the front of the neck. This happens because, after being stopped by the headrest, the driver's head sharply rebounds forward in order to catch up with acceleration of the torso. This causes simultaneous tightening up (shortening) and stretching (extending) of the muscles in the back of the neck which is unnatural for the human body. While this reaction is a natural attempt of the human body to protect itself under the normal forces, it becomes damaging under the excessive G-Forces experienced during a car crash. In less than 500 ms from the after the moment of initial impact, the seatbelt stops the forward movement of the driver's torso. However, driver's unsupported head continues its forward movement until the driver's neck is inclined forward to its full extent.

In short, during rear-end collisions the driver's head and neck first sharply incline backwards (which is unnatural to a human body), until head's occiput hits the headrest. Then, head and neck sharply reverse their movement and start to incline forward. Such a sharp reverse from backward to forward movement, which is called whiplash, creates most of the neck and head injuries produced during a rear-end collisions, including possible head internal hemorrhages or/and concussions resulting from the rough impact of driver's head against an existing headrest.

The present headrest apparatus prevents a driver's head from contact with an existing headrest, which in turn prevents concussions and head internal hemorrhages (or considerably reduces their severity). The specific shape of the present headrest apparatus supports the user neck and retains the user head. Appropriate adjustable variations in firmness and softness permit the driver to comfortably continue to rest his or her head and neck on the headrest at all time, even if driver's head is turning sideways. Such safety features are extremely important for the drivers of the driverless cars, especially when car is switched to an "autopilot" mode.

In the event of a rear-end collision, the present headrest apparatus prevents backward movement of the driver's head and neck and reduces forward acceleration of the driver's head to match the level of the acceleration of the torso, which prevents ligament or/and muscle damage in the front of the neck. An optional head retaining barrier assembly is provided as part of the headrest apparatus in order to restrict a forward and side movement of the driver's head and thereby to reduce the stretching of the back of the neck muscles. During a trip in a self-driving car (also called a driverless car) in which a driver is seated, the head retaining barrier assembly comfortably supports the resting head and neck of the driver while he or she leans forward, as well as the head and neck of any passengers having seats equipped with the present apparatus and barrier assembly.

To summarize, the headrest apparatus prevents (or greatly reduces severity of whiplash injuries, concussions and head internal hemorrhages at rear-end collisions.

To help prevent the above common and serious injuries, a first embodiment of the present headrest apparatus includes an upright mounting structure for connecting to and extending upwardly from a seat backrest, and a headrest framework secured to the upright mounting structure, the headrest framework including a rearward frame connecting structure and generally parallel and spaced apart first and second side frames extending forwardly from the frame connecting structure, and further including an upright sheet assembly fitted to and tautly suspended between and the first and second side frames forwardly of the connecting structure, for supporting a user head leaning back against the headrest apparatus. The framework is preferably itself resilient or includes biasing means so that the one or both side frames can be flexed toward each other against this resilient biasing to permit mounting of the sheet assembly over and around the side frames, and then released to pull the sheet assembly taut.

The upright mounting structure preferably includes two upright and laterally spaced apart support posts. The connecting structure preferably includes generally horizontal and spaced apart upper and lower connecting cross-members fastened to the support posts, each of which angle forwardly and interconnect at their cross-member ends to form a forwardly bowed member segments, thereby defining respectively the first and second side frames at first and second cross-member ends. The cross-members and support posts preferably are hollow tubes to be light in weight and inexpensive to manufacture. The cross-members preferably are resilient and the side frames preferably are bowed outwardly a few degrees for engaging the sheet assembly, so that when bowed toward each other to receive the sheet assembly, the sheet assembly holds the side frames substantially parallel with each other, while the side frames in turn hold the sheet assembly taut. This tautness is enough to support the user head and yet still permit the user head to bow the sheet assembly rearwardly and thereby sink back comfortably into the sheet assembly.

For a headrest apparatus mounted to a driver seat, an optional head retaining barrier assembly preferably is provided, including a resilient head retaining barrier which preferably takes the form of a strip such as of plastic, one end of which is pivotally secured the first side frame and the other end of which is pivotally secured to the second side frame. The head retaining barrier is elevated above the user head as the user sits in the driver seat, and then is manually pulled and thereby pivoted down to extend around the user forehead. A mechanism may be provided to hold the barrier at a selected angle of elevation. The head retaining barrier reduces whiplash injury. Also, for a driver seat, the headrest apparatus optionally includes a drowsiness alarm system which has embedded sensors for detecting when a person is seated in the driver seat and when the driver head is resting against the sheet assembly. When the drowsiness alarm system is activated and senses a person seated in the driver seat, but senses at the same time that the driver head is not resting against the sheet assembly, it sounds an alarm to wake a driver who may be falling asleep. The headrest apparatus also optionally includes a vibration mechanism which can be activated to deliver vibration into the sheet assembly to ease soreness in user neck and shoulders and relax the user.

The sheet assembly preferably includes a sheet suspension portion for supporting a user head, and first and second side frame engaging structures such as sheet side portions extending rearwardly from the sheet suspension portion which the outward surfaces of the side frames are resiliently biased against, as noted above, so that the sheet assembly is removably secured by friction to the framework. A first cushion strip preferably is glued onto the suspension sheet portion adjacent to the first sheet assembly side portion so that it extends over the first side frame forward surface when mounted, and a second cushion strip preferably is glued onto the sheet suspension portion adjacent to the second sheet assembly side portion so that it extends over the second side frame forward surface to cushion the hard side frame. The first and second cushion strips preferably are tubular and sized to snugly and fit over side frame member segments. The suspension sheet portion optionally is perforated for ventilation, with circular perforations preferably being provided in rows to form a perforation grid. There are circumstances where it may be preferred not to have such perforations. An example might be for a vehicle seat headrest where wind from open windows can circulate to the rear of the passenger compartment and then forwardly through the perforations against the user head and neck. To accommodate drivers' specific hair styles, for example a ponytail, the suspension sheet portion may have an optional opening in the area where driver's occiput is resting on the suspension sheet. The opening is preferably covered with an elastic mesh to prevent a driver's hair from getting inside of the headrest.

Alternatively, the side frames are first and second side panels, and the connecting structure is an interconnection panel extending between and connected to the rearward ends of the first and second side panels. The side panels are biased by side panel biasing means so that the side panel forward ends are biased several degrees apart from being parallel with each other while remaining in generally forwardly extending positions, to pull the sheet suspension portion taut.

To fit the sheet assembly onto the headrest framework, one end is placed around the forward end of a corresponding side frame or side panel so that the sheet assembly side portion abuts the outward surface of the side frame or panel, and then the side frames or panels are pivoted a few degrees toward each other so that the other end of the sheet assembly can be fitted around the forward end of the other side frame or side panel. Then the side frames or panels are released so that the biasing means pull the sheet suspension portion taut.

For one version, the side panels are fixedly attached to the interconnection panel, preferably at opposing interconnection panel ends. The side panels and the interconnection panel are formed of a resilient material such as a suitable heavy plastic sheet, so that the side panels spring back to their original positions when bent, and therefore function as the side panel biasing means. Alternatively, the side panels are separate pieces which are mounted to the interconnection panel with hinges, and optional springs bias the side panels outwardly relative to the interconnection panel to upright positions. A panel stop preferably is provided for each panel, and the panel springs can be positioned to press in only the outward panel pivot direction until the given panel abuts the stop.

The side frame forward surfaces, or side panel forward edges, preferably are configured to follow a smooth undulating curve with a forward curve at the lower and upper ends of each side frame or panel, separated by a rearward middle curve. The sheet assembly first and second side portions preferably have undulations at their forward ends matching the undulations of the respective adjacent first and second side frames or panels, so generally to include a forward and a rearward curve. The forward lower curve of the sheet suspension portion fits into a user neck, the rearward middle curve forms a nesting region for the user head and the forward upper curve retains the user head in the headrest apparatus. A key inventive feature of the headrest apparatus is that the sheet assembly is pulled most taut by the frame or panel biasing means along the forward most segments of the side frames because they are at the greatest radial distance from the frame or panel pivot points. As a result, the sheet assembly is most firm and taut along the forward lower curve to support the user neck, and along the forward upper curve to firmly retain the user head in the nesting region. The rearward middle curve by the same token is less taut and firm, to more comfortably cushion a user head. While these undulations are preferred, providing side frame or side panel forward edges with differently shaped and sequenced curves is contemplated to produce other sheet assembly undulations and therefore other support characteristics.

As noted above, a drowsiness alarm system preferably is provided as part of the headrest apparatus, to wake and alert a driver if he or she begins to fall asleep while driving. While on a long (or/and overnight) trip which may cause falling asleep behind the wheel, driver may choose to activate the drowsiness alarm system for safety. The system can be deactivated by the driver at any time. When the driver leaves the car seat, the drowsiness alarm system is automatically deactivated. The alarm system includes a sound generating alarm, an alarm circuit having a seat pressure sensor mounted in the driver seat to detect when a user is seated, and a sheet sensor which is preferably is a pressure sensor. To detect when a user head is resting against the sheet assembly the sheet sensor is preferably mounted in the inner side of the sheet suspension portion or in a side frame or side panel. When the sheet sensor detects that the user head is tilting forward and no longer resting against the sheet, and the seat pressure sensor detects that a person is still resting on the seat, the alarm circuit sends an electric signal to the sound generating alarm to wake a driver who has begun to fall asleep. The drowsiness alarm system preferably generates a loud sound from a small electric buzzer preferably installed in the frame of the headrest apparatus.

A sheet assembly vibration mechanism is preferably provided to deliver soothing vibration to the head of a user, to ease pain such as may be caused by strained neck or shoulder muscles.

2. Description of the Prior Art

There have long been headrests for comfortably supporting a user head while the user drives a vehicle. A solid cushion can be and usually is hard and rigid and can exert too much force against a user neck. A problem with prior and traditional headrests is that they do not reliably prevent whiplash injuries. (It is required vehicle headrests provide not more then 2.2-inch space between a headrest and a user head.) A further problem has been that they do not provide optimum support for the user head and neck. Yet another problem has been that these headrests do not have any mechanism to alert and wake a driver who is falling asleep at the wheel. Finally, none of these headrests appear to provide tension easing vibration to relieve sore neck and shoulder muscles. Another problem, in the case of non-vehicle seats or chairs, has been that heat from the user body and luck of ventilation can make them uncomfortably hot.

Prior head supports, such as pillows are disclosed in the following patents: U.S. Pat. No. 5,337,429, issued on Aug. 16, 1994 to Tucker, disclosing a head support for bed-ridden patients; U.S. Pat. No. 5,033,138, issued on Jul. 23, 1991 to Hong, teaching a rest up apparatus for head a rest; U.S. Pat. No. 6,581,226, issued on Jun. 24, 2003 to Brustein, revealing an open frame pillow and head support system; U.S. Pat. No. 2,695,415, issued on Nov. 30, 1954, disclosing a mattress; U.S. Pat. No. 1,921,984, issued on Aug. 8, 1933, teaching a combined sunshade and headrest; and U.S. Pat. No. 490,865, issued on Jan. 31, 1893, revealing a headrest.

It is thus an object of the present invention to provide a headrest apparatus that cradles the user head while absorbing the initial impact of a vehicle collision as the driver or passenger body is moving rearwardly, and is well suited to preventing whiplash injuries in vehicles, and that will at least partially absorb shocks and therefore prevent head and neck pain of a driver or passenger while traveling on a bumpy road.

It is another object of the present invention to provide such a headrest which can retain the user head against substantial forward movement relative to the headrest, such as with a head retaining barrier extending forwardly from the headrest and around the forehead of the user, thereby preventing the combination of abrupt rearward and forward movements that can lead to whiplash injuries.

It is still another object of the present invention to provide such a headrest apparatus which remains in contact with a user head virtually continuously for support against whiplash injury, unlike most existing headrests which are spaced an two or more inches rearwardly of the user head, and yet which never becomes hot from contact with a user body or otherwise, primarily in non-vehicle seats, and is fully ventilated and breathes so that any sweat quickly evaporates and readily passes air.

It is yet another object of the present invention to provide such a headrest apparatus which preferably is shaped to support a user neck and retain a user head with appropriate adjustable variations in firmness and softness.

It is a still further object of the present invention to provide such a headrest apparatus which, optionally includes a vibration means to vibrate the sheet assembly of the headrest apparatus and thereby sooth the user tensions and ease muscle pain.

It is a still yet another object of the present invention to provide such a headrest apparatus which includes means for sensing whether a driver head is pivoting forwardly off the headrest apparatus indicating that the driver is falling asleep, which thereupon triggers a drowsiness alarm to wake the drowsy driver, the drowsiness alarm, preferably taking the form of noisy sound from a small electronic buzzer.

It is finally an object of the present invention to provide such a headrest apparatus which is sturdy, light in weight and inexpensive to manufacture.

SUMMARY OF THE INVENTION

The present invention accomplishes the above-stated objectives, as well as others, as may be determined by a fair reading and interpretation of the entire specification.

A headrest apparatus, including a mounting structure for connecting to and extending upwardly from a seat backrest; a headrest framework secured to the mounting structure, the headrest framework including a frame connecting structure and generally parallel and spaced apart first and second side frames extending forwardly from the frame connecting structure; and an upright sheet assembly fitted to and suspended between and the first and second side frames, forwardly of the connecting structure, for supporting a user head leaning back against the headrest apparatus.

The sheet assembly preferably includes a sheet suspension portion formed of a substantially non-stretchable material for supporting a user head and first and second side sheet assembly side portions. The first and second sheet assembly side portions preferably are secured by hook and loop fastener strips on the first and second sheet assembly side portions and on the first and second side frames. The sheet assembly preferably is secured to the headrest framework by fasteners.

The mounting structure preferably includes two upright and laterally spaced apart support posts, and the connecting structure preferably includes generally horizontal and spaced apart upper and lower connecting cross-members fastened to the support posts and each curving forwardly and having first and second cross-member ends which interconnect to form forwardly bowed member segments, thereby defining respectively the first and second side frames at the first and second cross-member ends. The cross-members and support posts preferably are hollow tubes and are resilient. The side frames preferably bow laterally outwardly a few degrees for engaging the sheet assembly. The apparatus preferably includes a vertical series of notches in each of the support posts and a notch engaging mechanism to permit incremental apparatus height adjustment relative to a seat backrest.

The sheet assembly preferably includes a sheet suspension portion for supporting a user head, and first and second side frame engaging structures. The frame engaging structures preferably are first and second sheet assembly side portions extending rearwardly from the sheet suspension portion which the outward surfaces of the first and second side frames are resiliently biased against, so that the sheet assembly is removably secured with friction engagement to the framework.

The first side frame preferably has a first side frame forward surface and the second side frame preferably has a second side frame forward surface, and a first cushion strip preferably is glued onto the suspension sheet portion adjacent to the first sheet assembly side portion so that the first cushion strip extends over the first side frame forward surface when mounted, and a second cushion strip is glued onto the sheet suspension portion adjacent to the second sheet assembly side portion, so that the second cushion strip extends over the second side frame forward surface to cushion the side frames.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
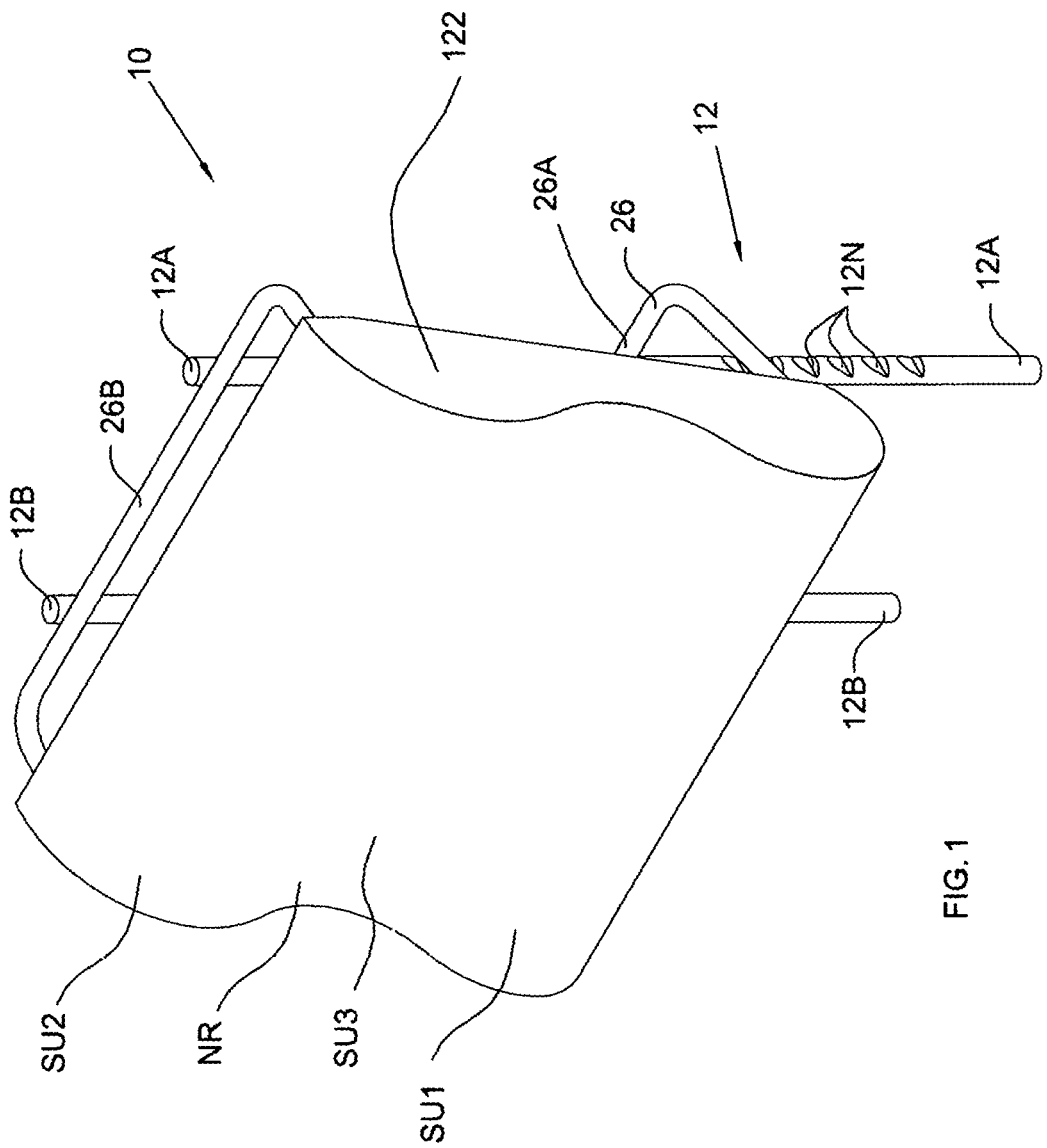
FIG. 1 is a front perspective view of the preferred embodiment of the apparatus.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
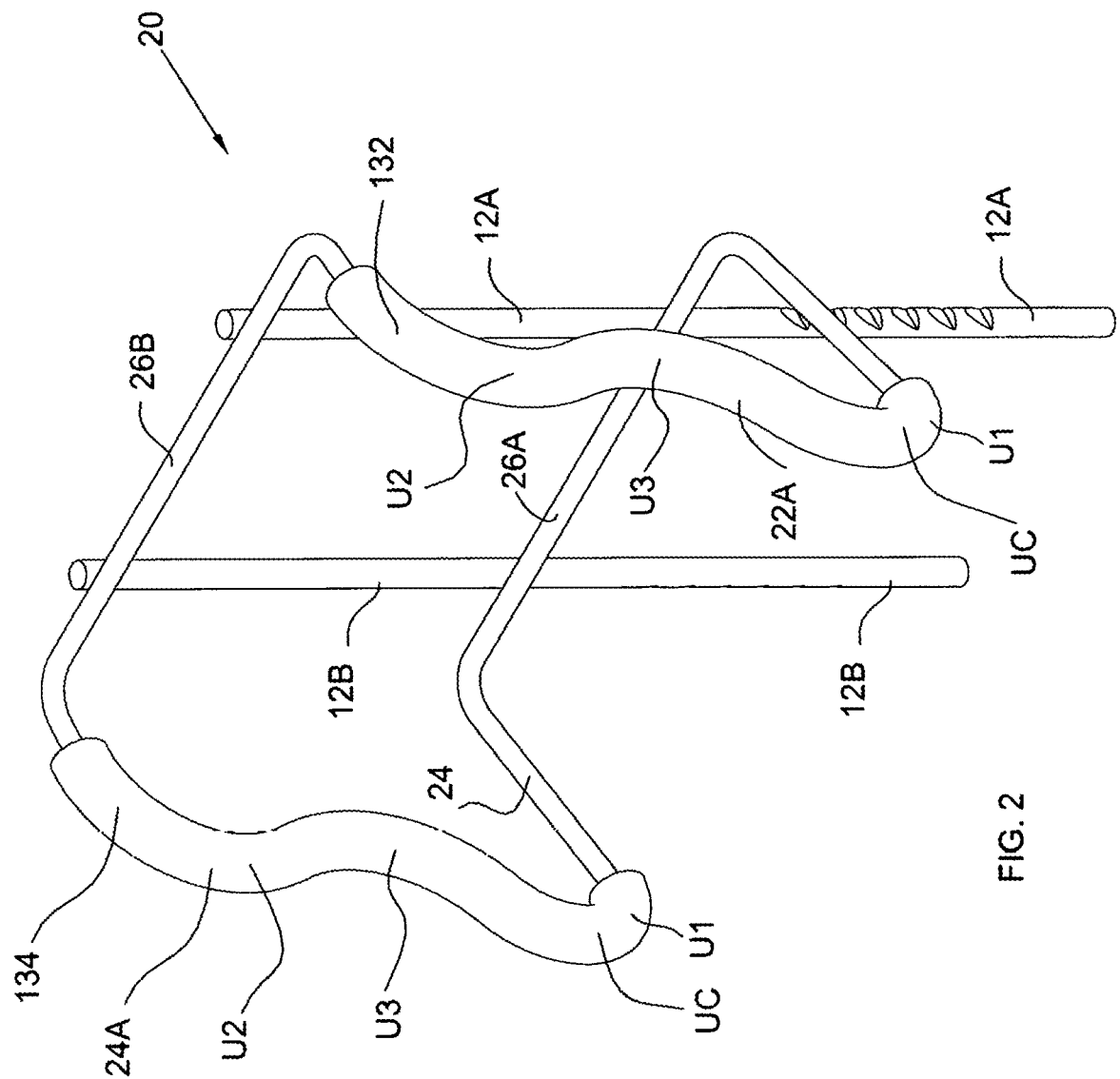
FIG. 2 is a view as in FIG. 1 with the sheet assembly removed.
Figure 3:
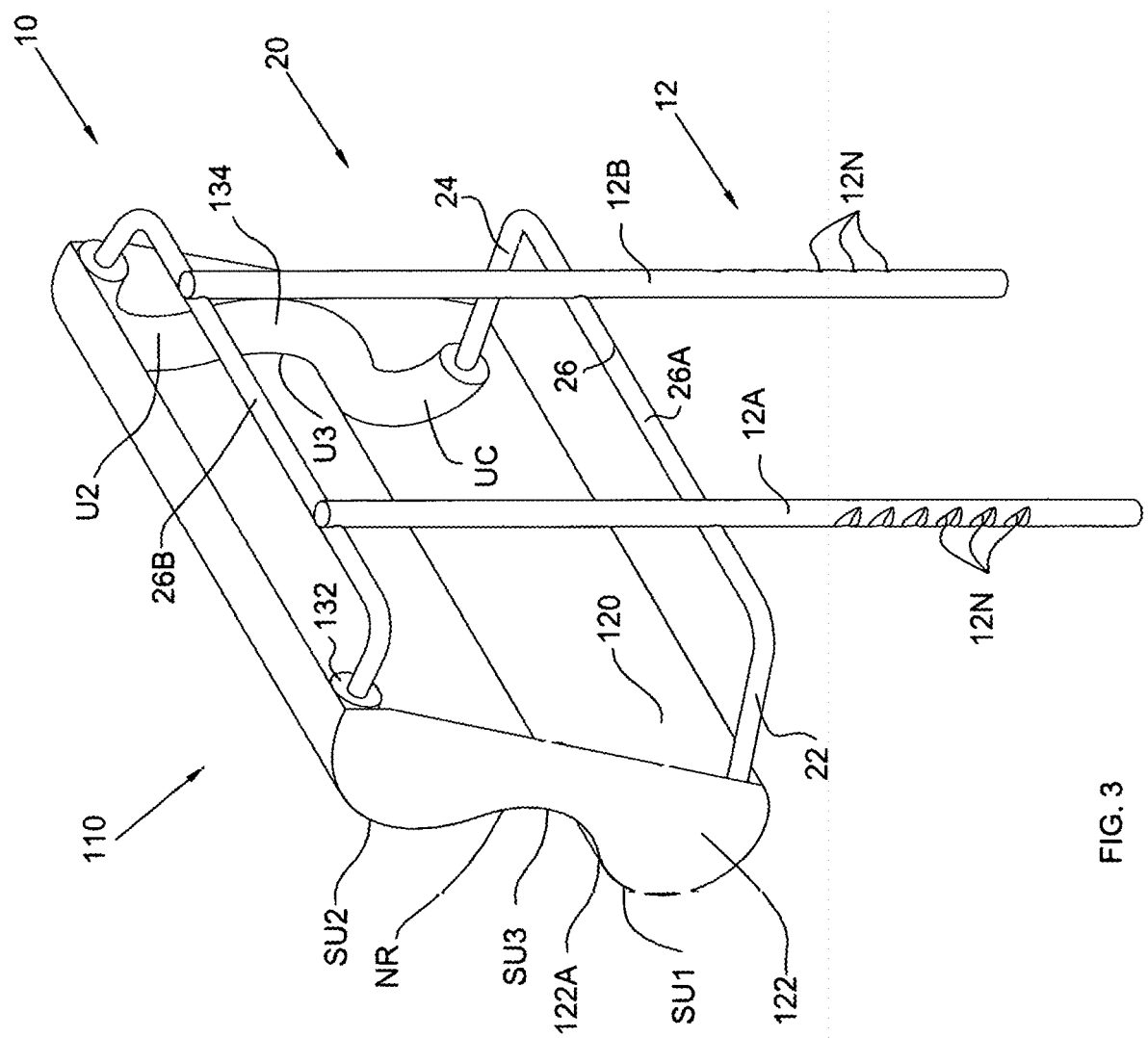
FIG. 3 is a rear perspective view of the apparatus of FIG. 1.
Figure 4:
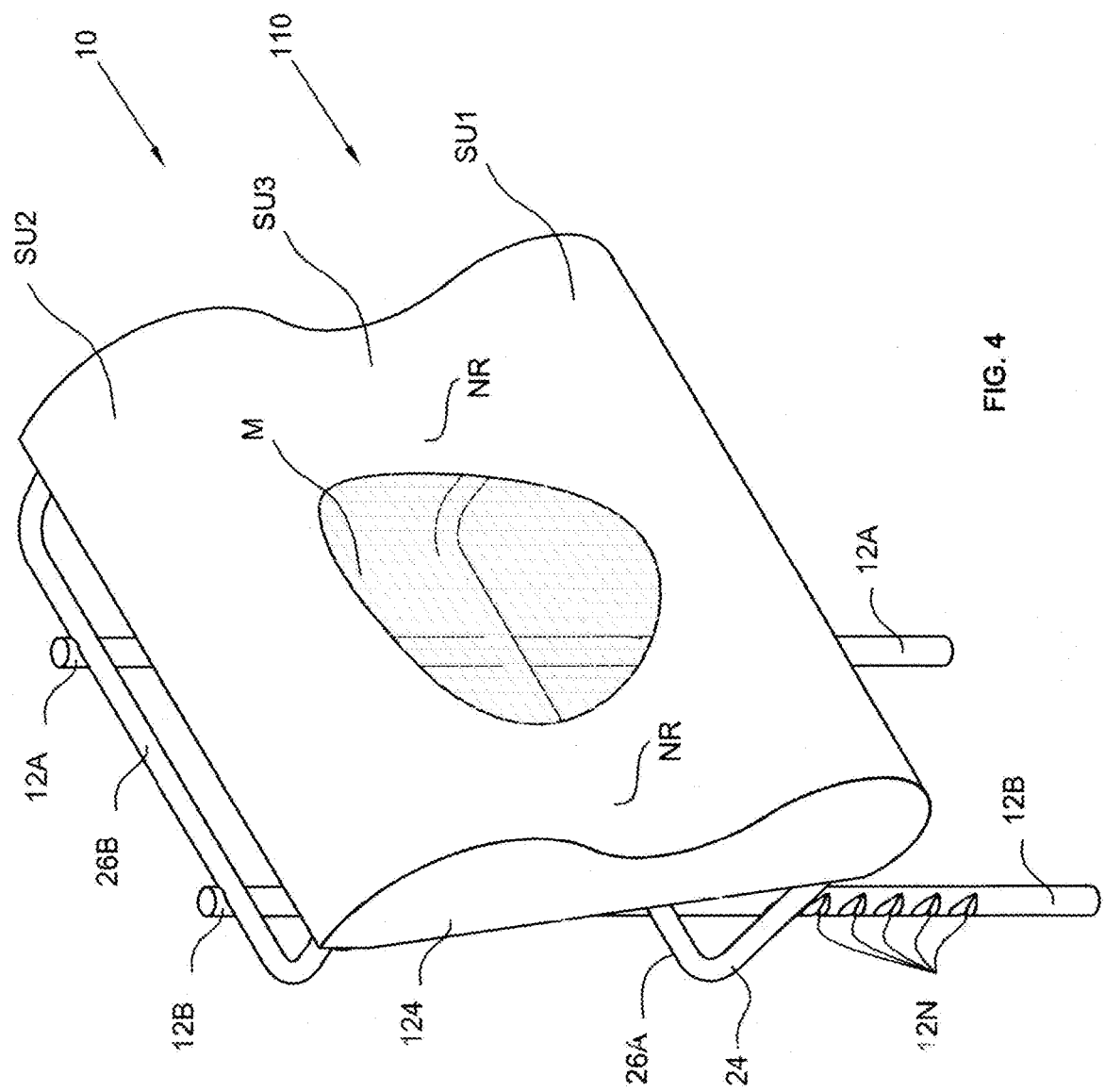
FIG. 4 is a front perspective view of the apparatus, in which the sheet assembly has a hole filled with breathable, head supporting mesh.
Figure 5:
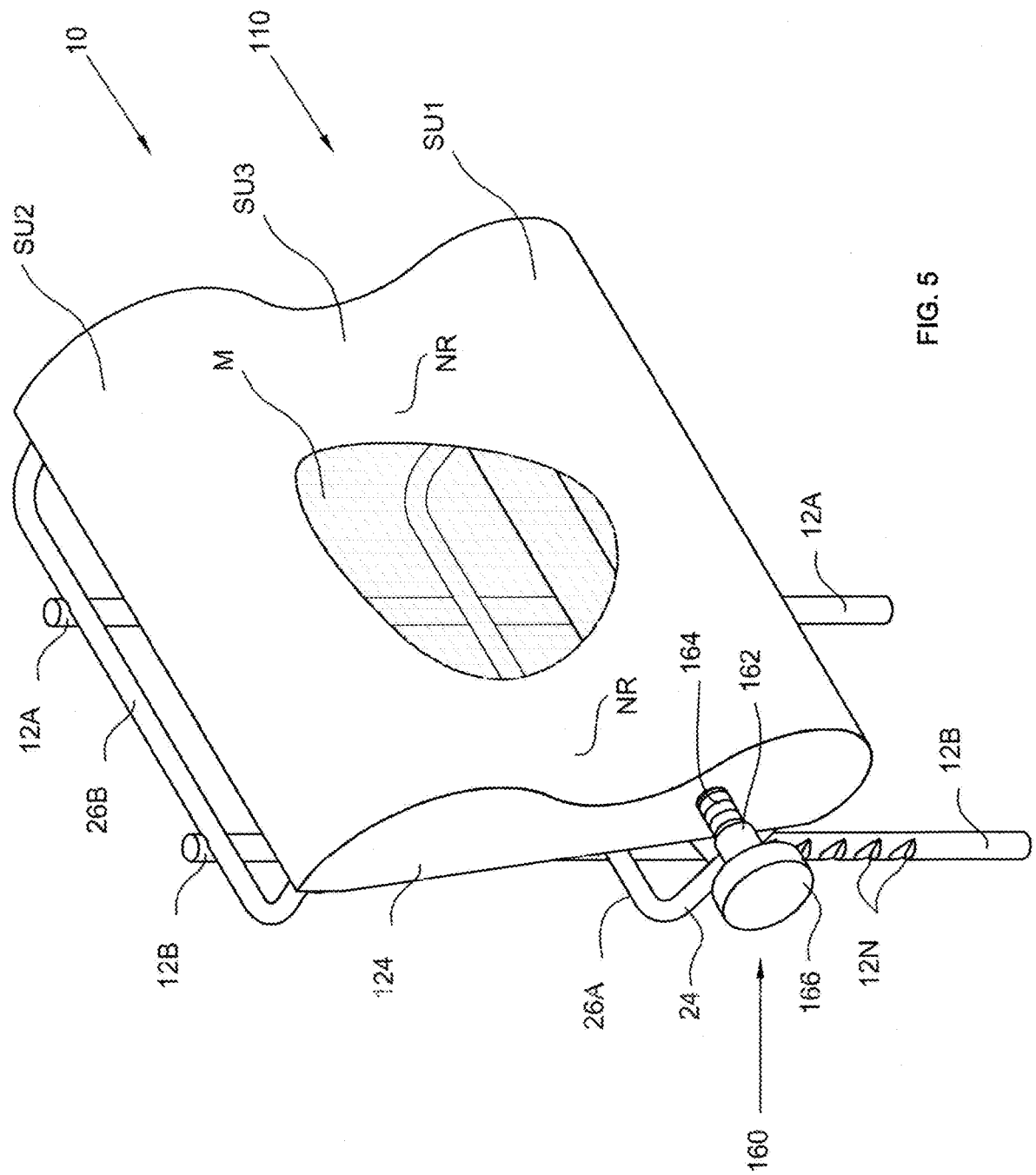
FIG. 5 is a view as in FIG. 4, but with the optional side frame spacing assembly added.
Figure 6:
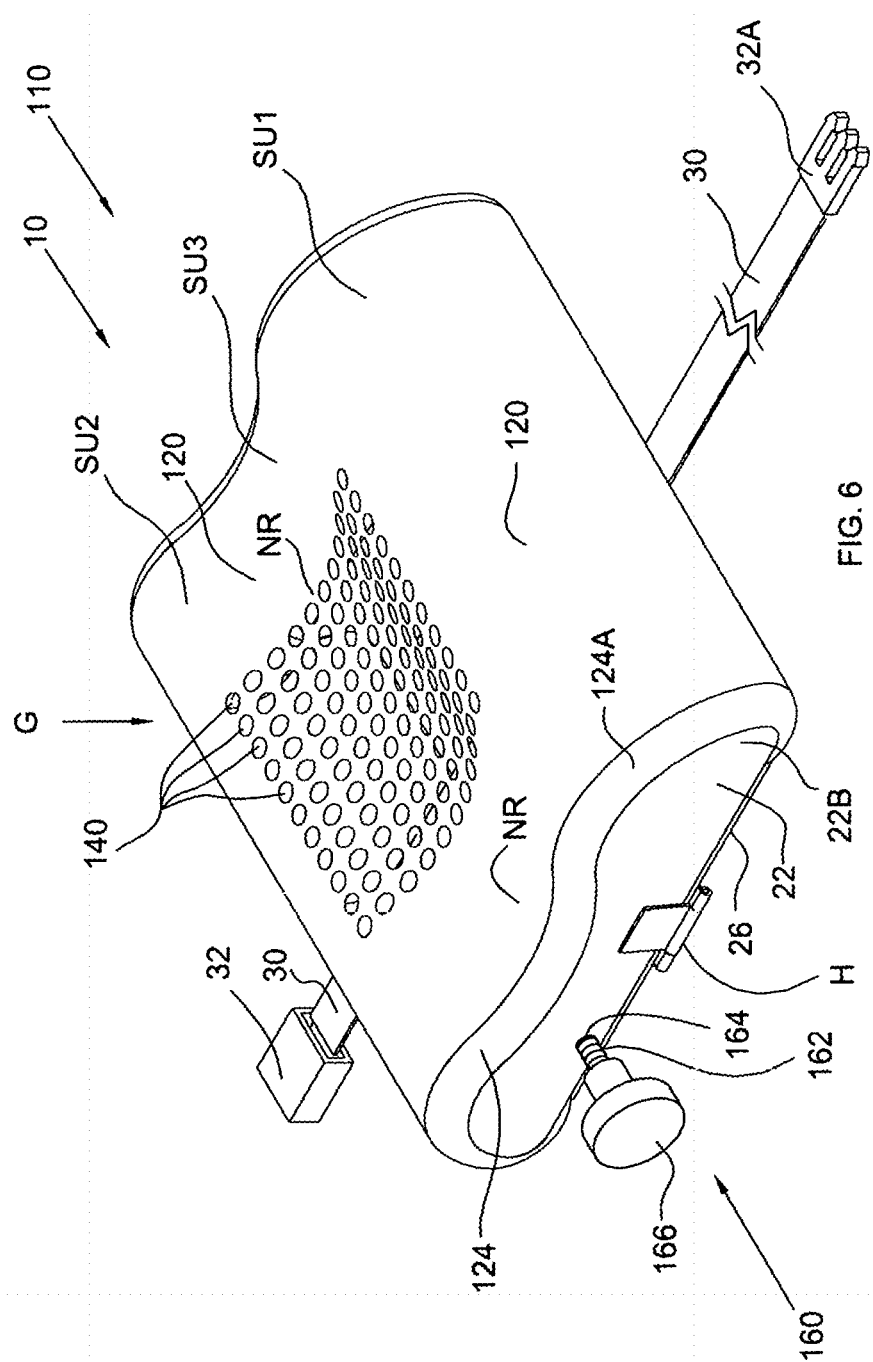
FIG. 6 is a lower, side perspective view of the apparatus of FIG. 5, showing the headrest mounting strap.
Figure 7:
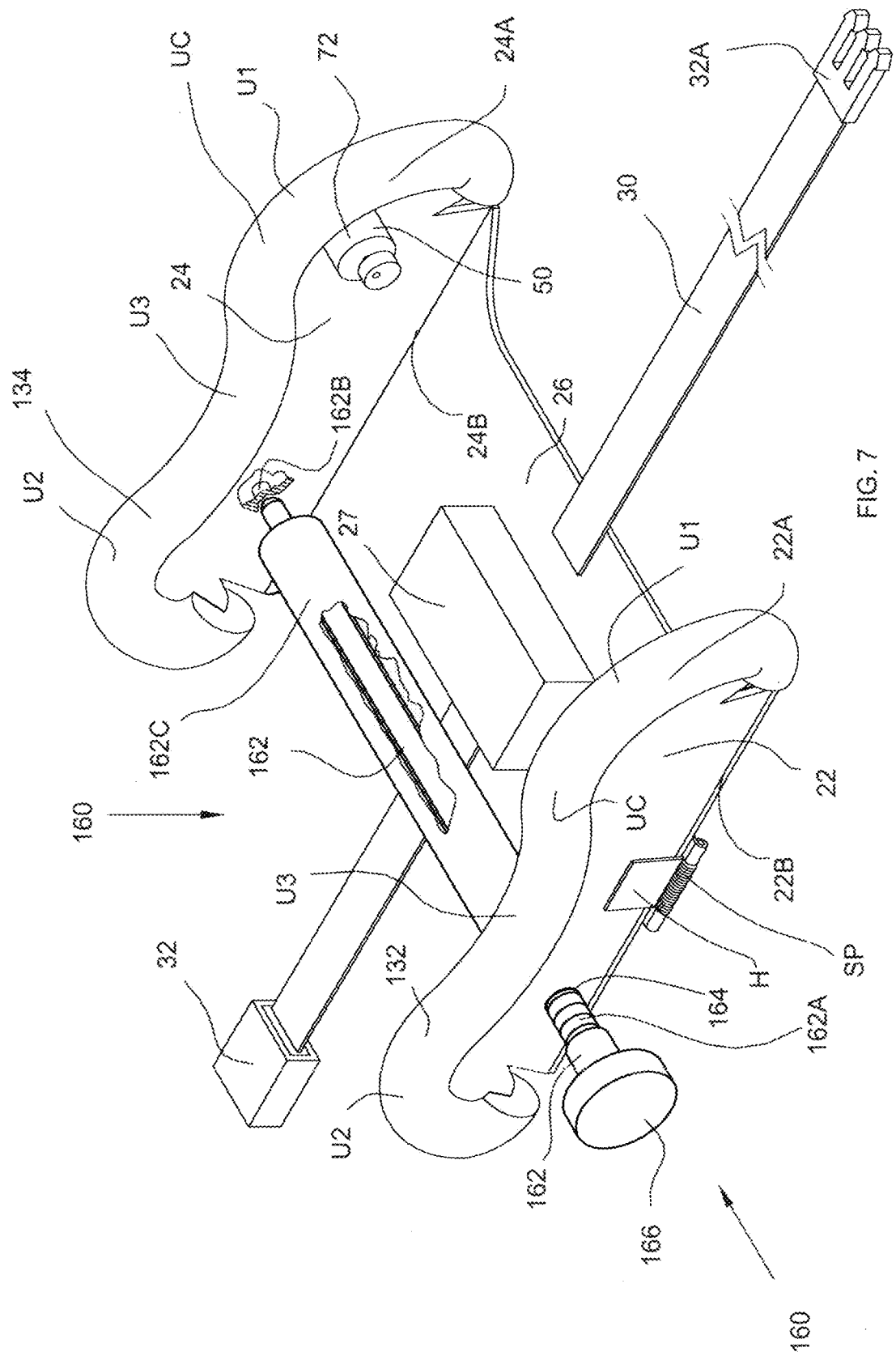
FIG. 7 is a view as in FIG. 6 with the sheet assembly removed to reveal parts behind it.
Figure 8:
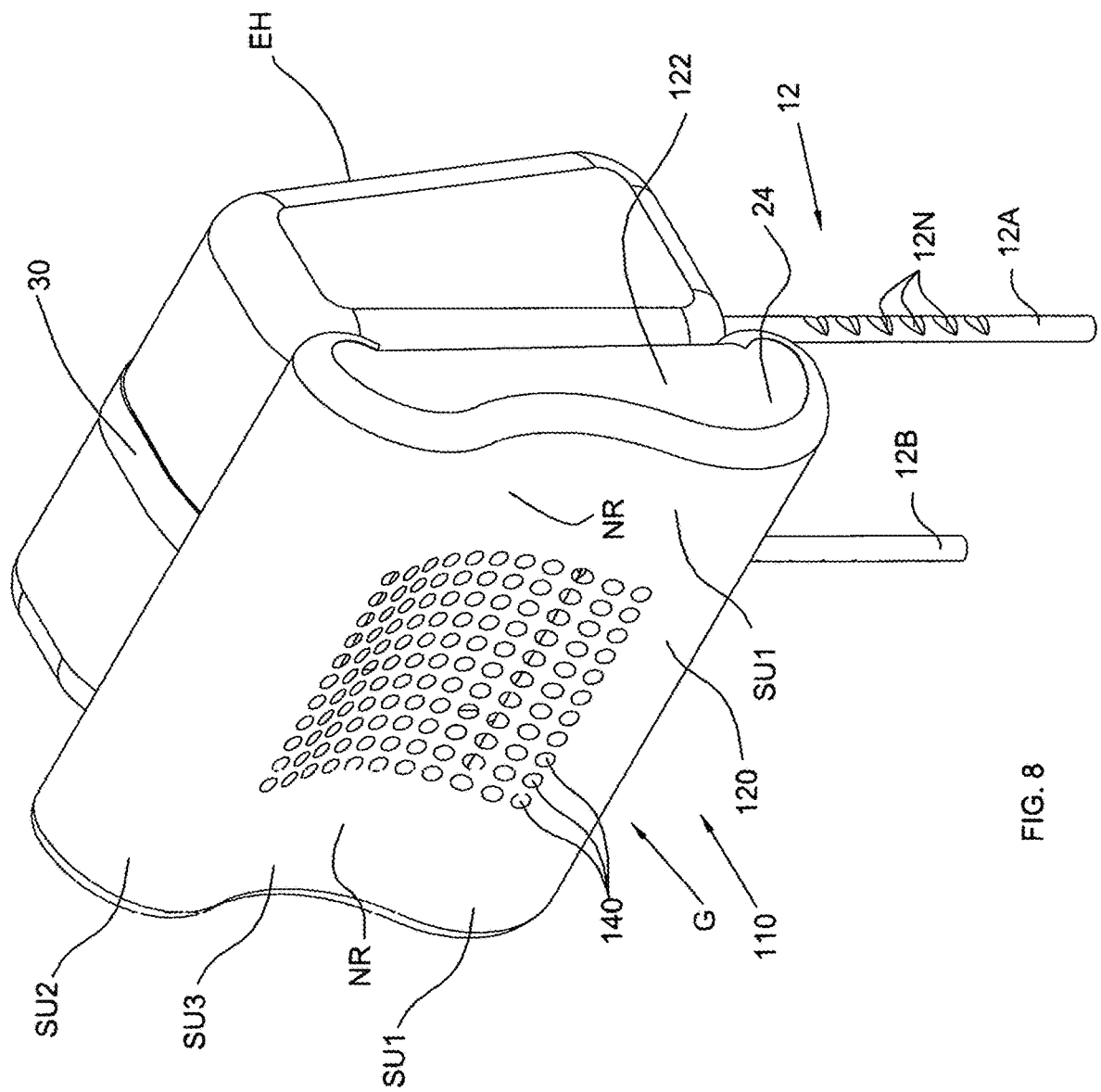
FIG. 8 is a front perspective view of the apparatus secured to a headrest with the mounting strap.
Figure 9:
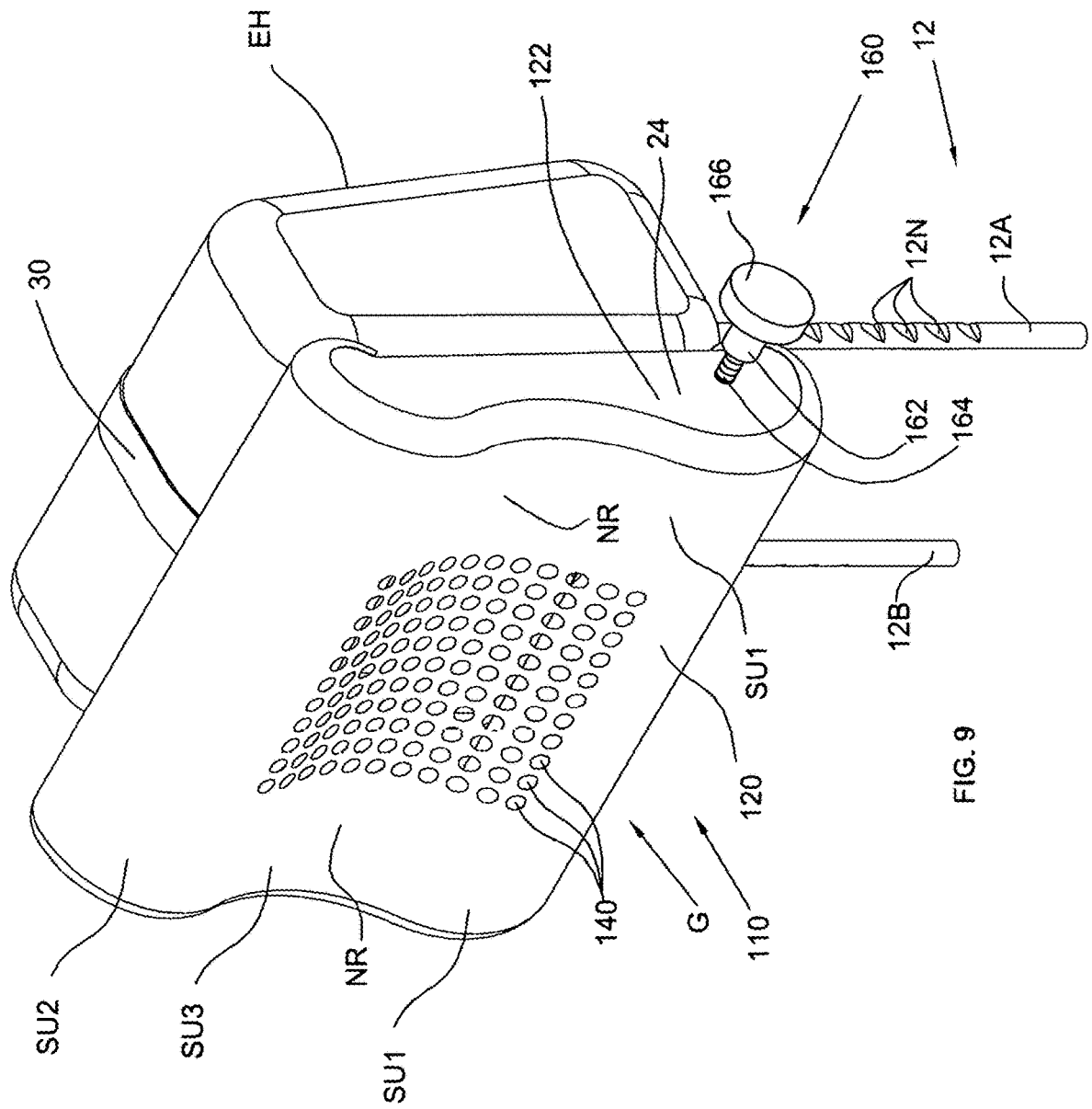
FIG. 9 is a view as in FIG. 8 with the optional side frame spacing assembly added.
Figure 10:
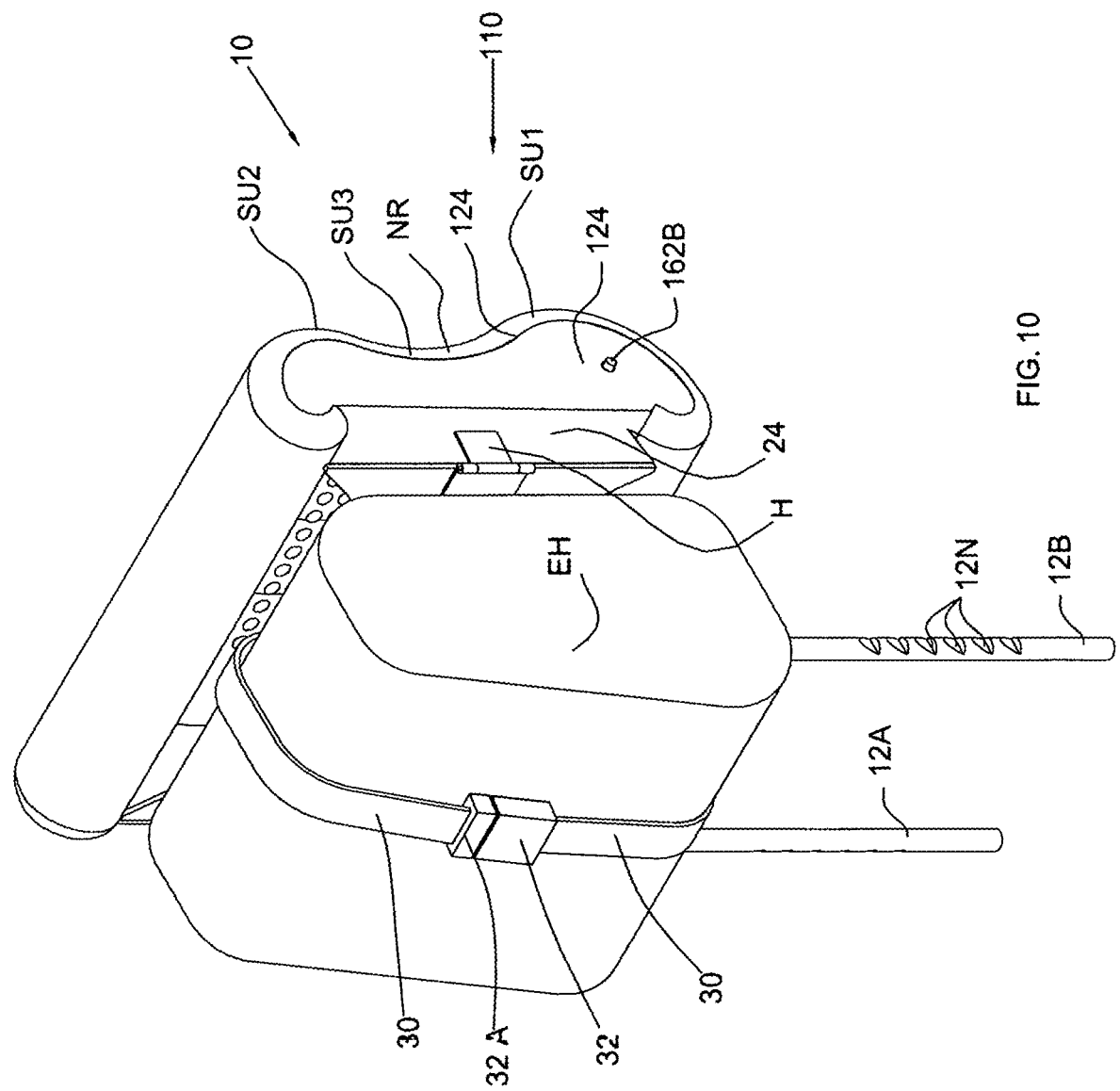
FIG. 10 is a rear perspective view of the apparatus secured to a headrest with a mounting strap as in FIG. 8.
Figure 11:
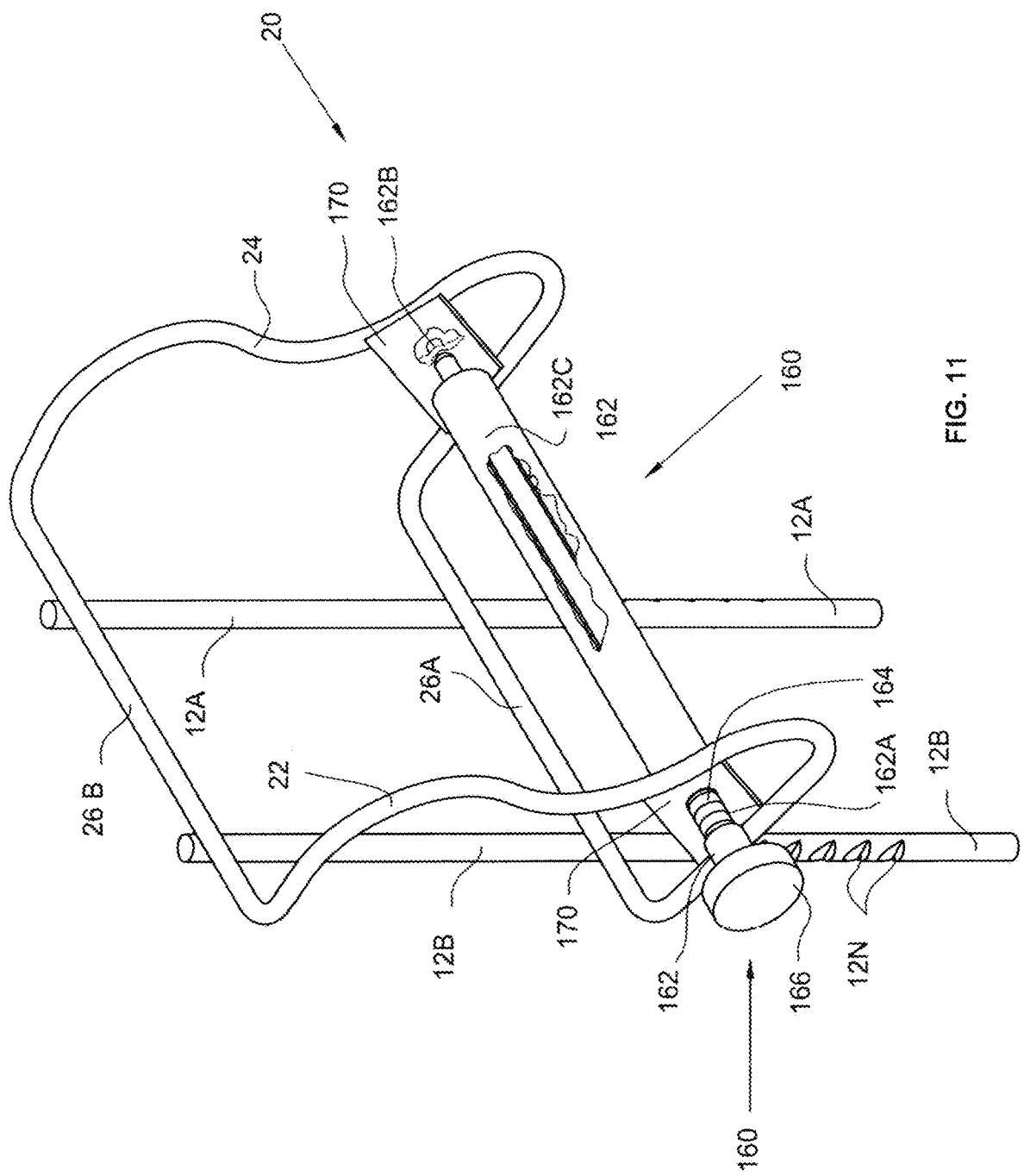
FIG. 11 is a view as in FIG. 5, with the sheet assembly removed to reveal the parts behind it.
Figure 12:
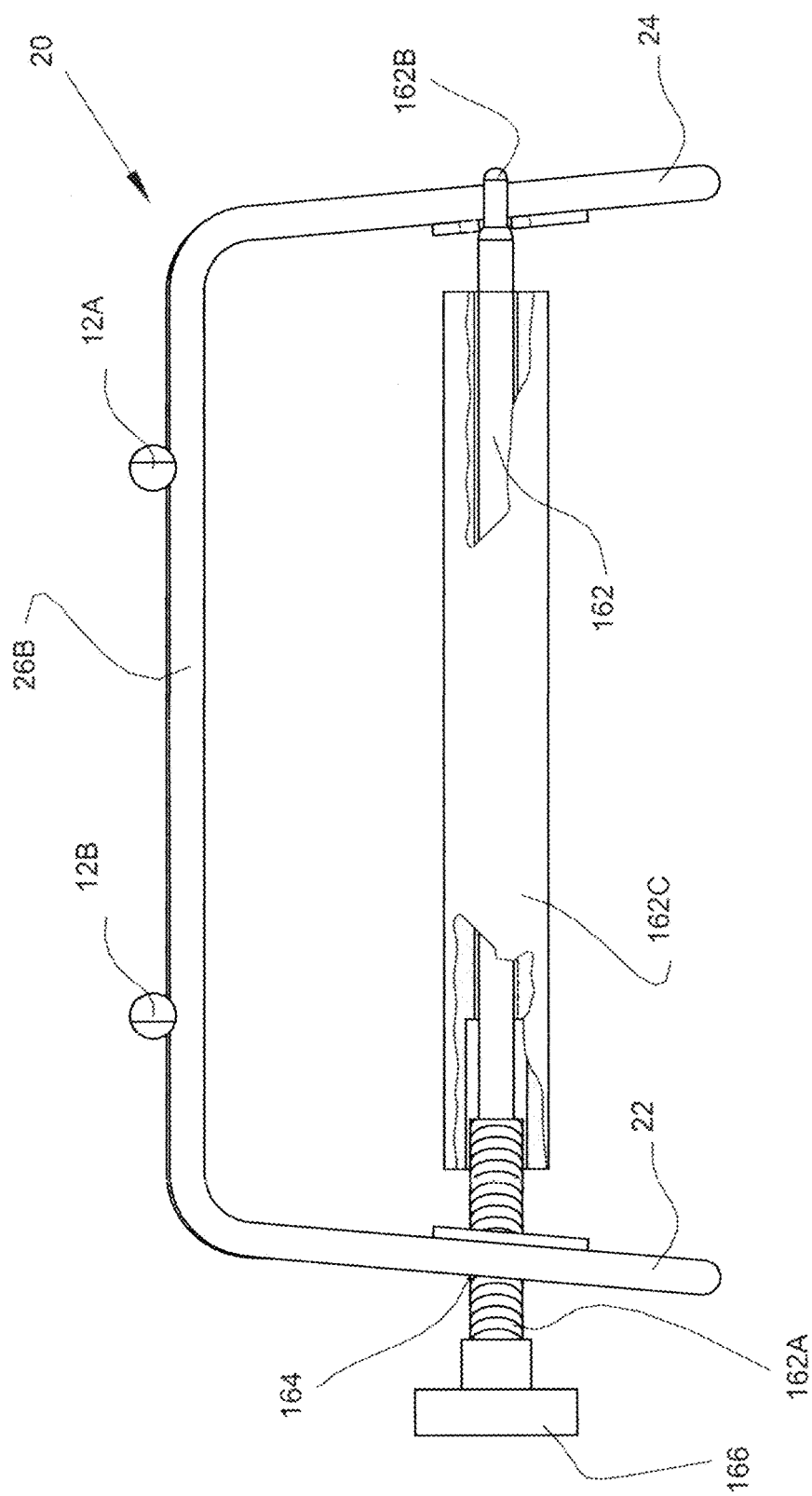
FIG. 12 is a top plan view of the apparatus of FIG. 11.
Figure 13:
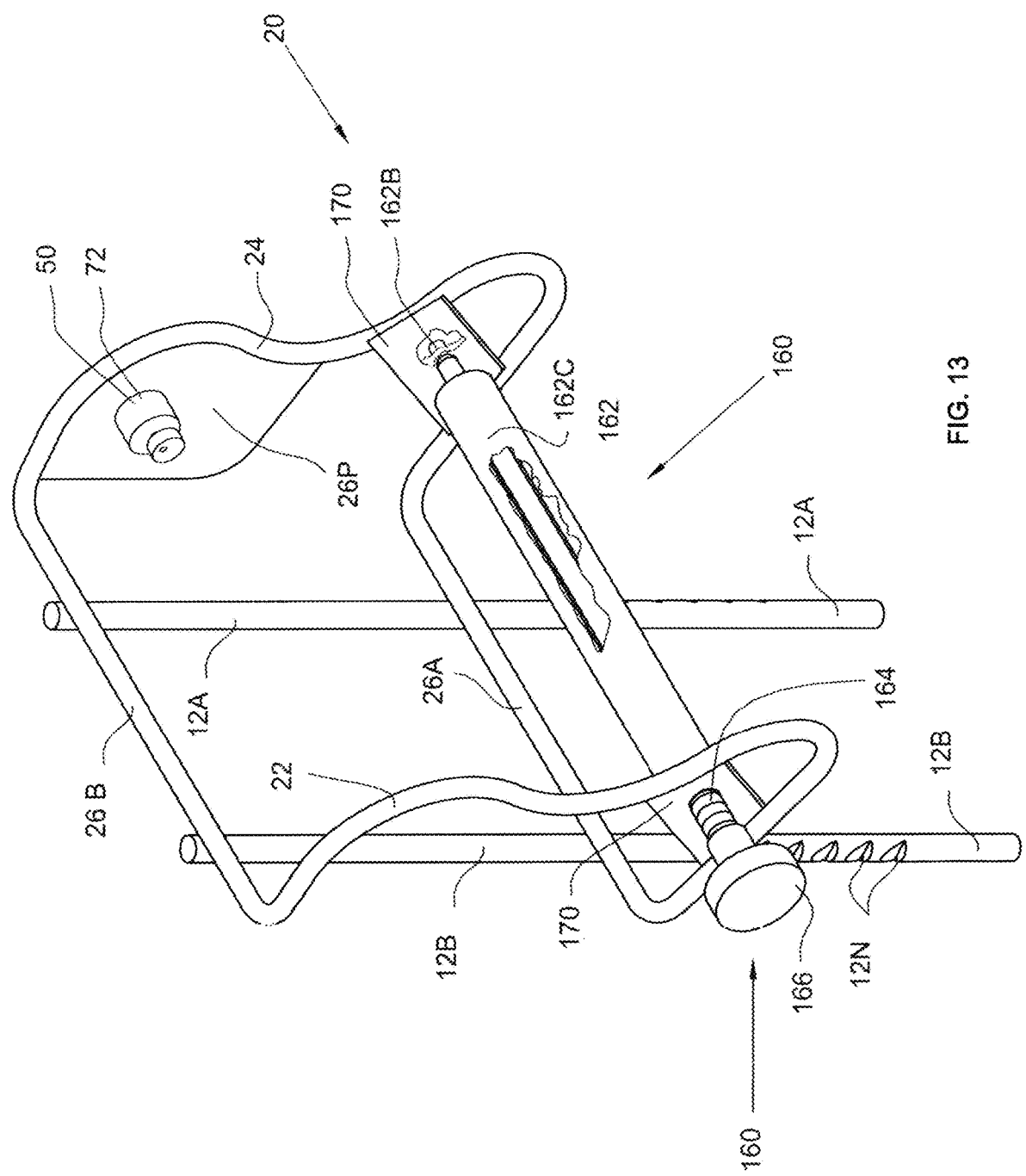
FIG. 13 is a view as in FIG. 11 with the optional sheet assembly vibration mechanism added.
Figure 14:
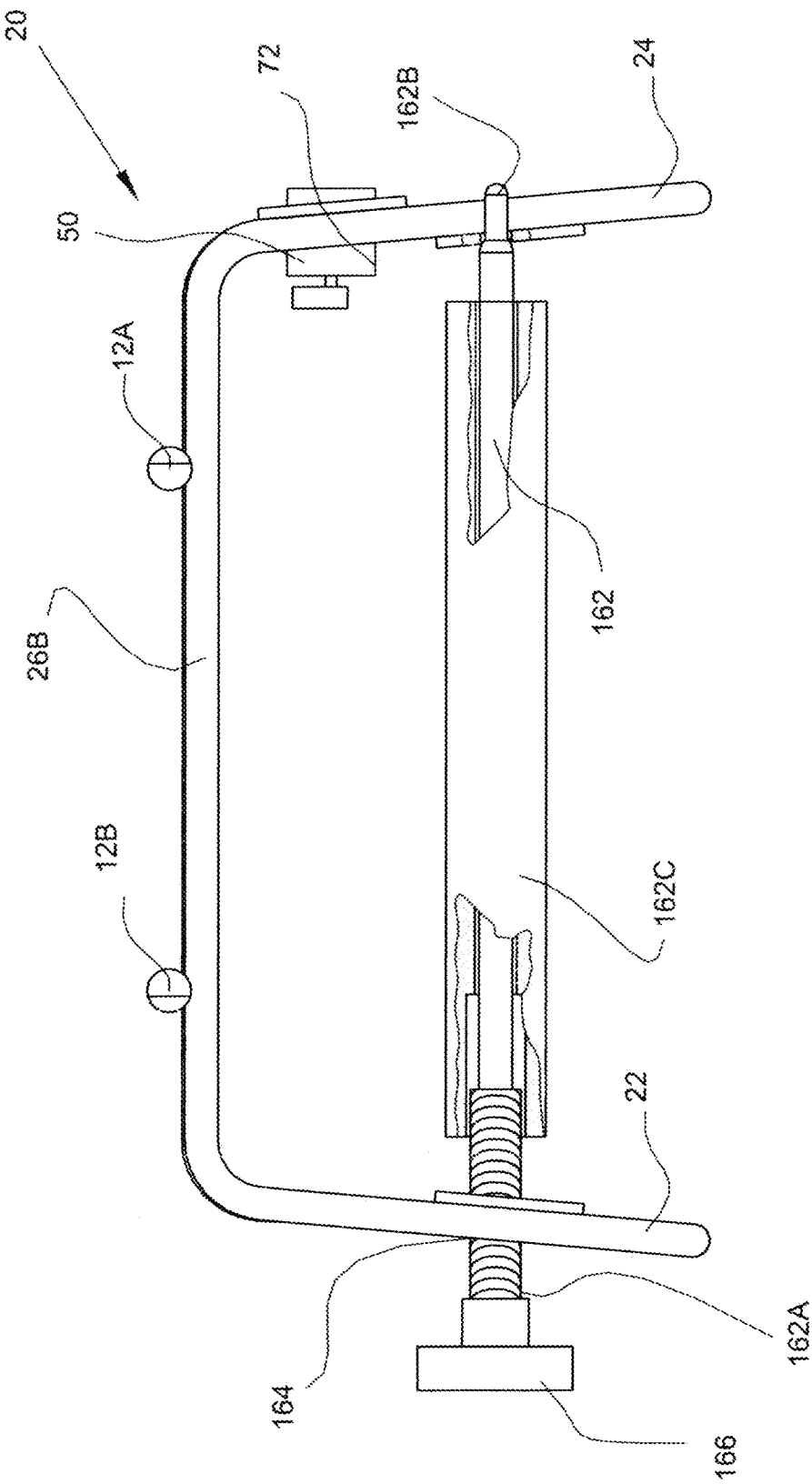
FIG. 14 is a top plan view of the assembly as shown in FIG. 13.
Figure 15:
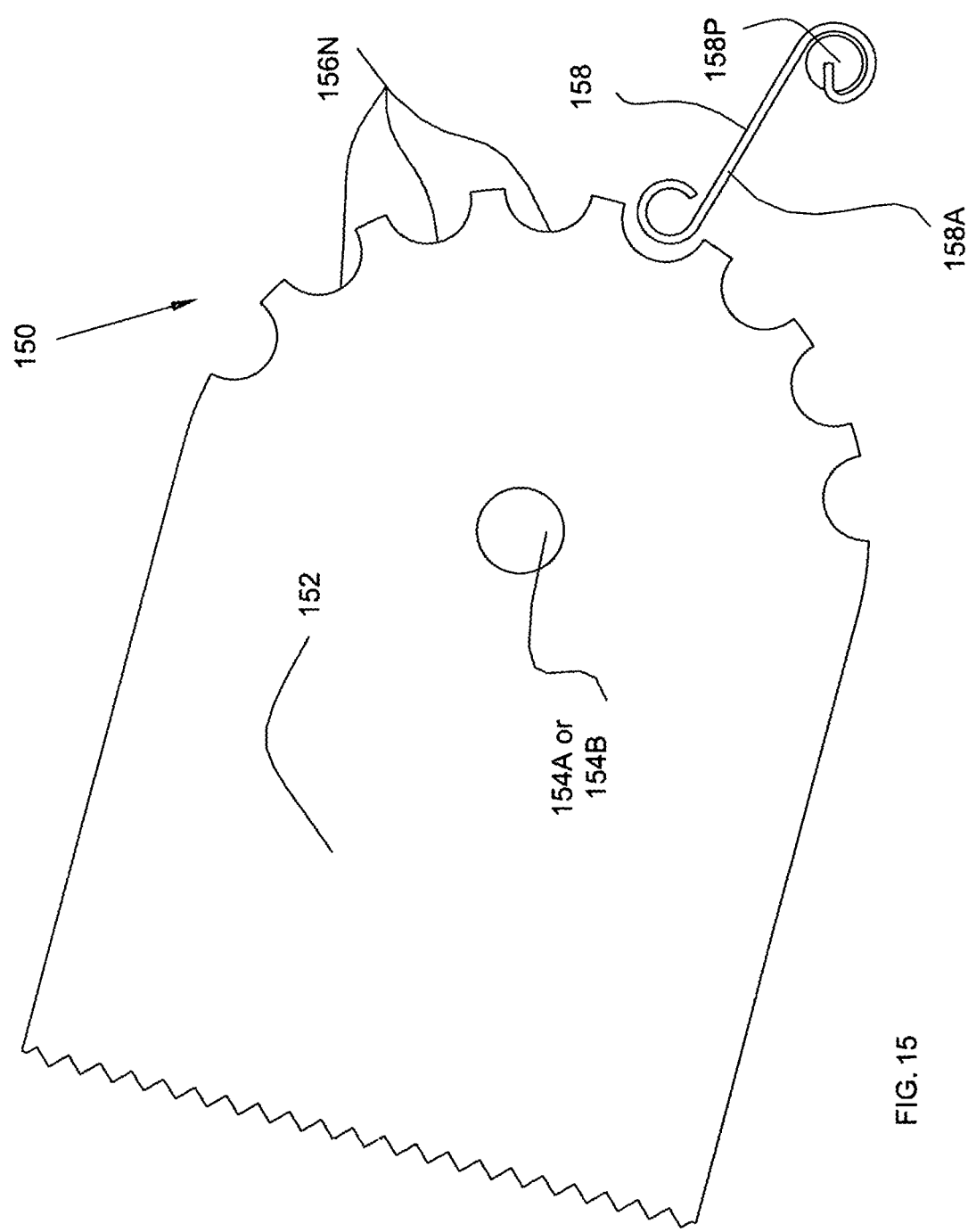
FIG. 15 is a side view of the rear portion of a head retaining barrier, showing elements of the head retaining barrier assembly.
Figure 16:
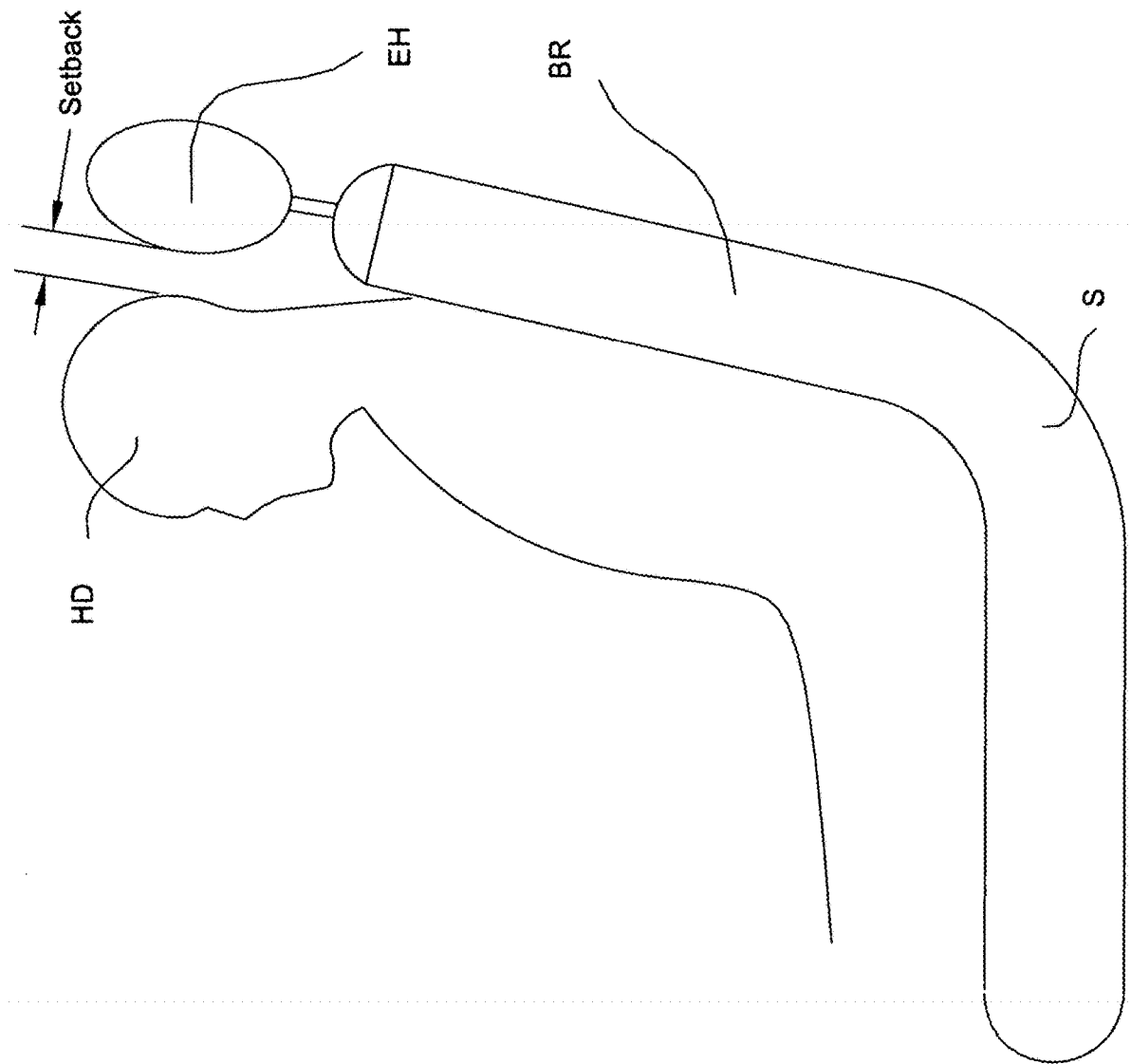
FIG. 16—is a side view of a person seated in a vehicle seat without the present apparatus, illustrating the spacing between the person's head and the headrest at the moment the car is struck and starts move forward, but the driver's body still remains in its initial position.
Figure 16A:
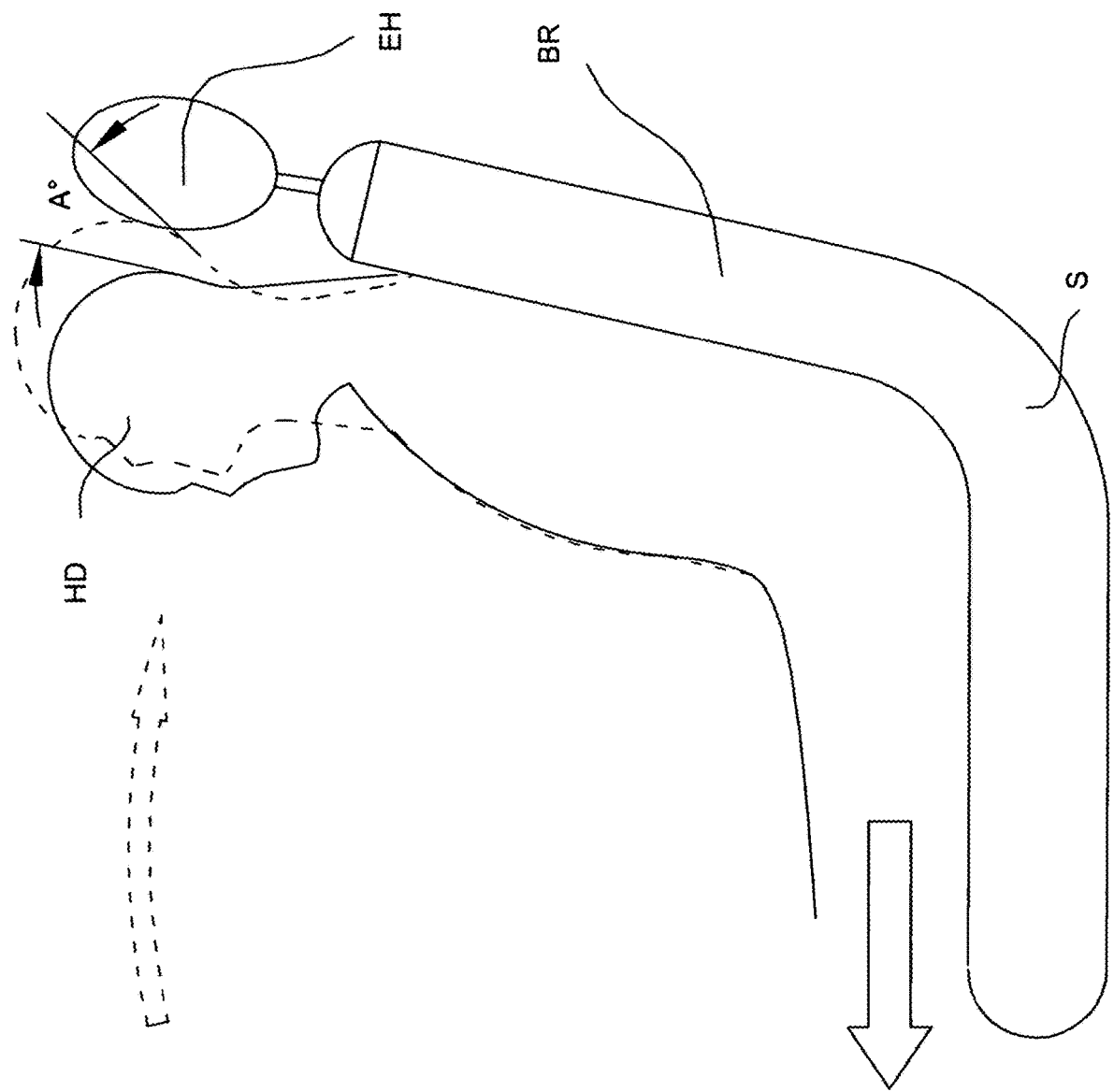
FIG. 16A illustrates the movement of the person's head immediately after the car is struck, with the existent headrest at the moment when the driver's head (dashed lines) moves rearward relative to his or her torso and finally hits the existent headrest, at which moment the driver's neck is rotated at the angle A°.
Figure 16B:
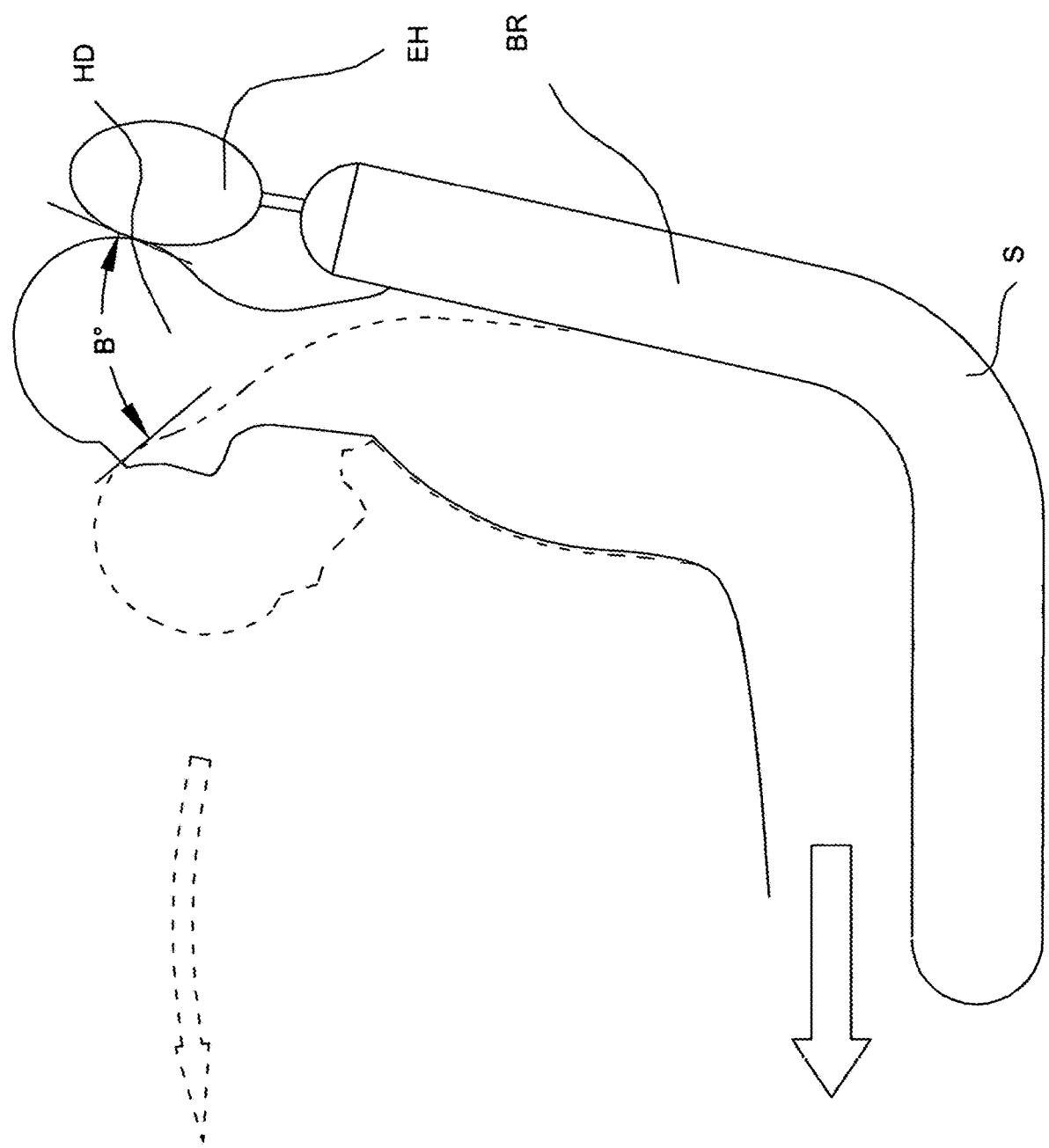
FIG. 16B illustrates driver movement immediately subsequent to the moment shown in FIG. 16A, at the moment when the driver's torso has moved forward and then is stopped by a seatbelt while the driver's head continues its forward movement to the full extent permitted by the neck, pivoted forward to the angle B° (dashed lines).
Figure 16C:
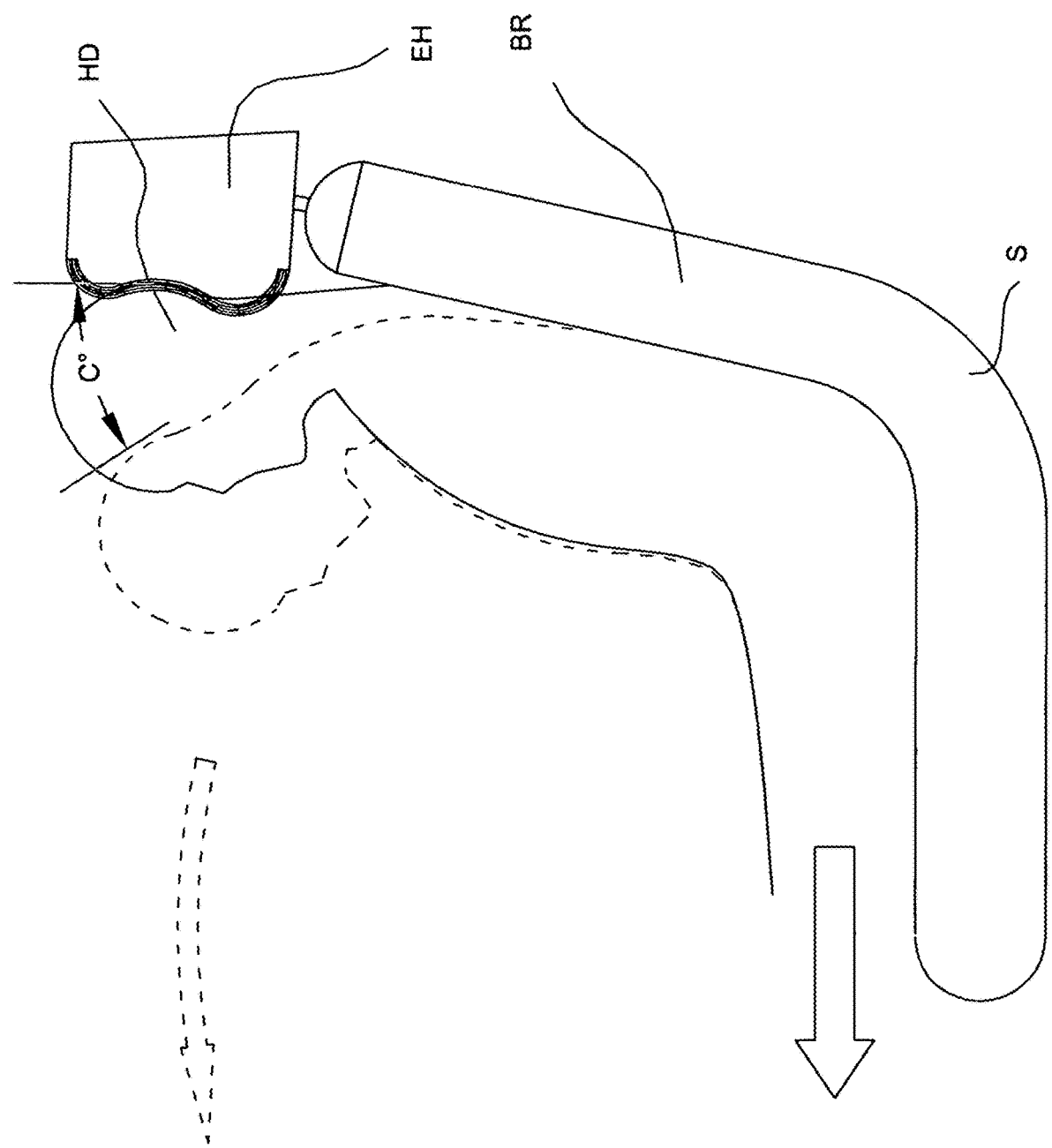
FIG. 16C illustrates a crash the of car equipped with the present headrest apparatus at the moment when the driver's torso moved forward and is stopped by a seatbelt while the driver's head continues its movement forward to the full extent permitted by the neck (dashed lines) pivoted forward to the angle C° (which is much lower than angle B° shown in FIG. 16B).
Figure 16D:
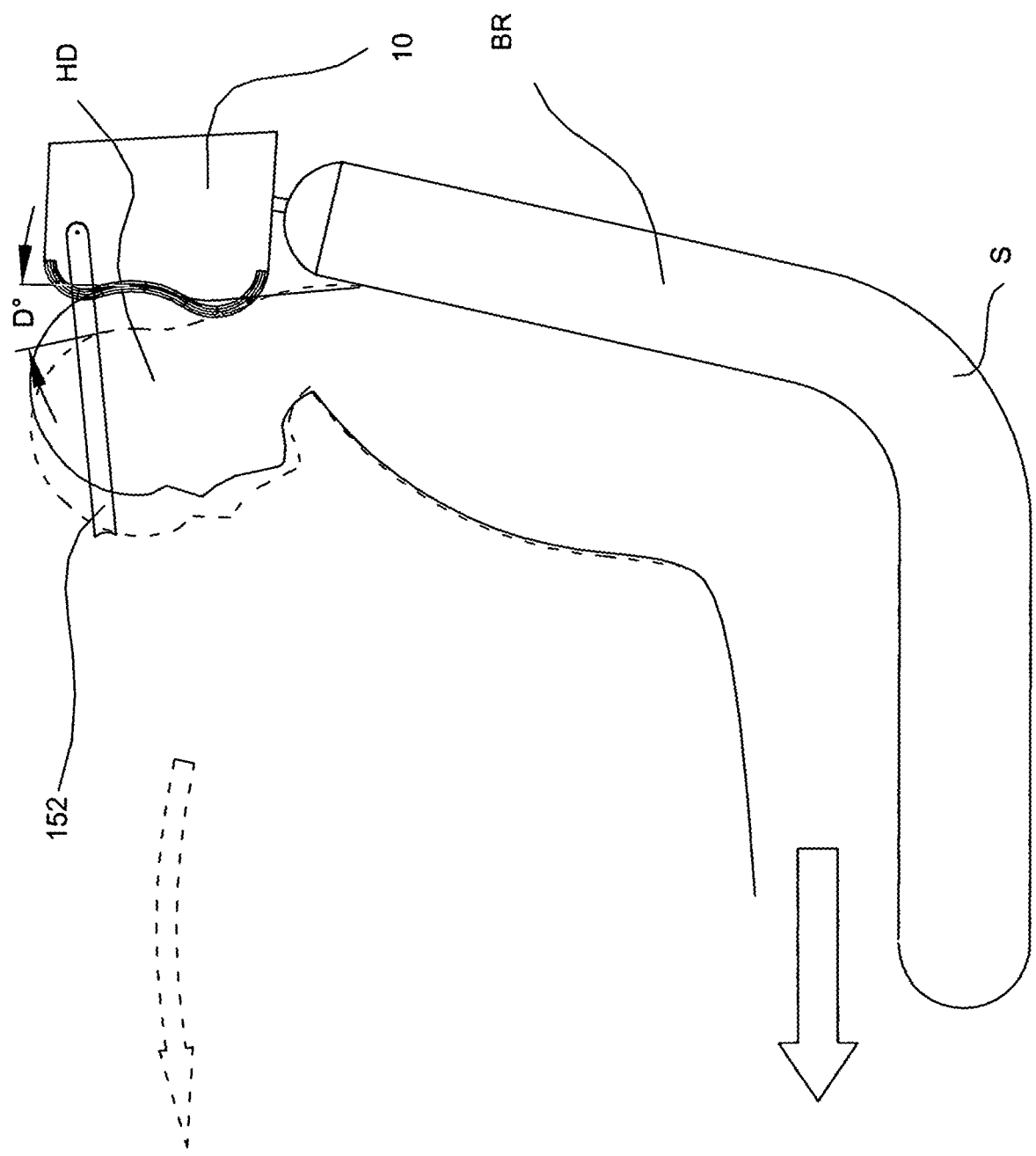
FIG. 16D illustrates further a crash the of car equipped with the present headrest apparatus at the moment when the driver's torso moves forward and is stopped by a seatbelt while the driver's head continues its movement until the driver's head has stopped by an optional head retaining barrier assembly and the neck (dashed lines) rotated forward only to the angle D° (which is much lower than angle C° on the FIG. 16C).
Figure 17:
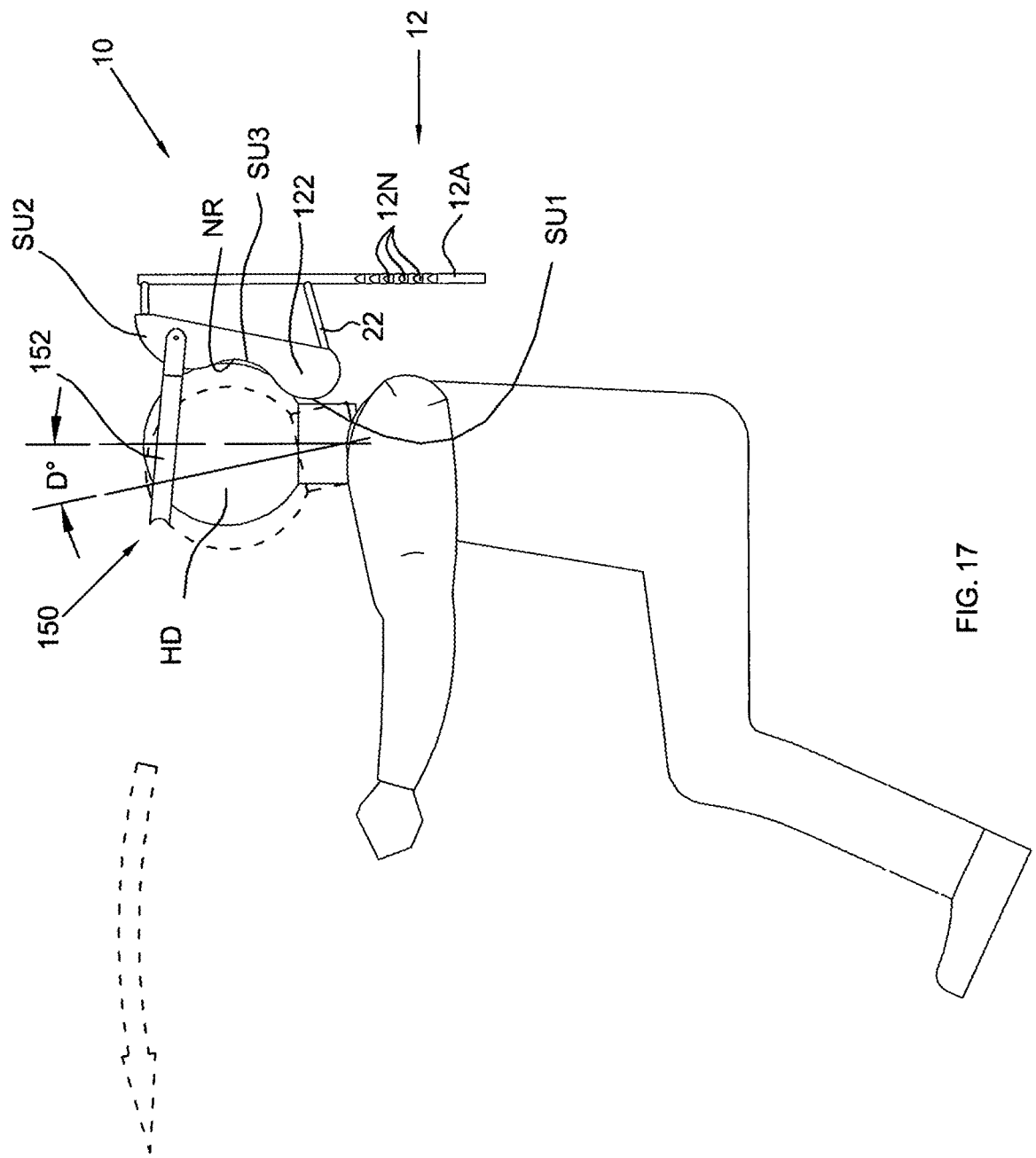
FIG. 17 illustrates a seat equipped with the optional head retaining barrier assembly and how that assembly restrains and prevents forward movement of a driver's head beyond a predetermined point, showing the driver's head inclining forward (dashed lines) form the initial position of the crash until the driver's head is stopped by the barrier assembly.
Figure 18:
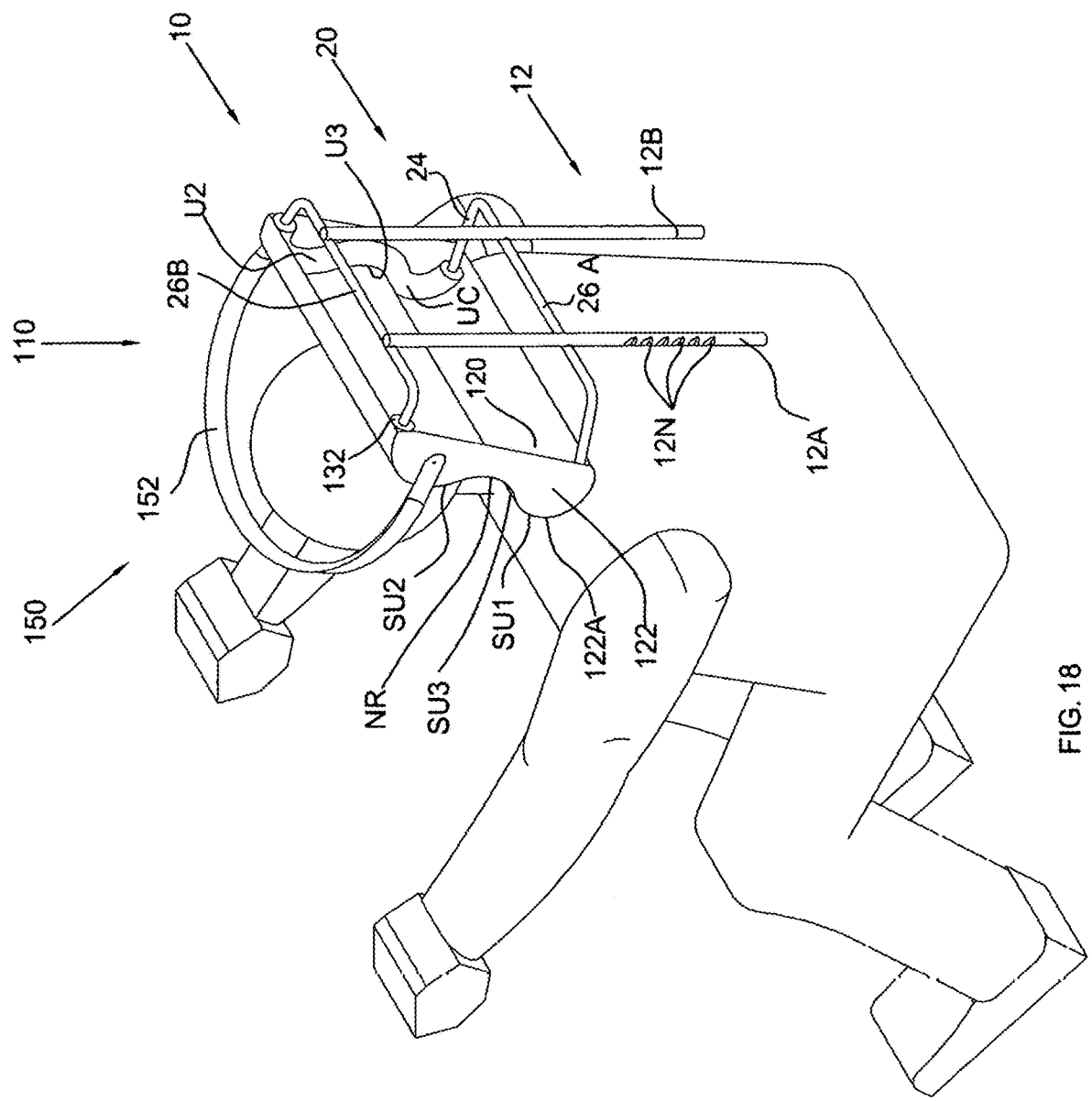
FIG. 18 is a rear perspective view of a seated driver illustrating the initial moment of the crash where the retaining barrier assembly is in a distance from the driver's head.
Figure 19:
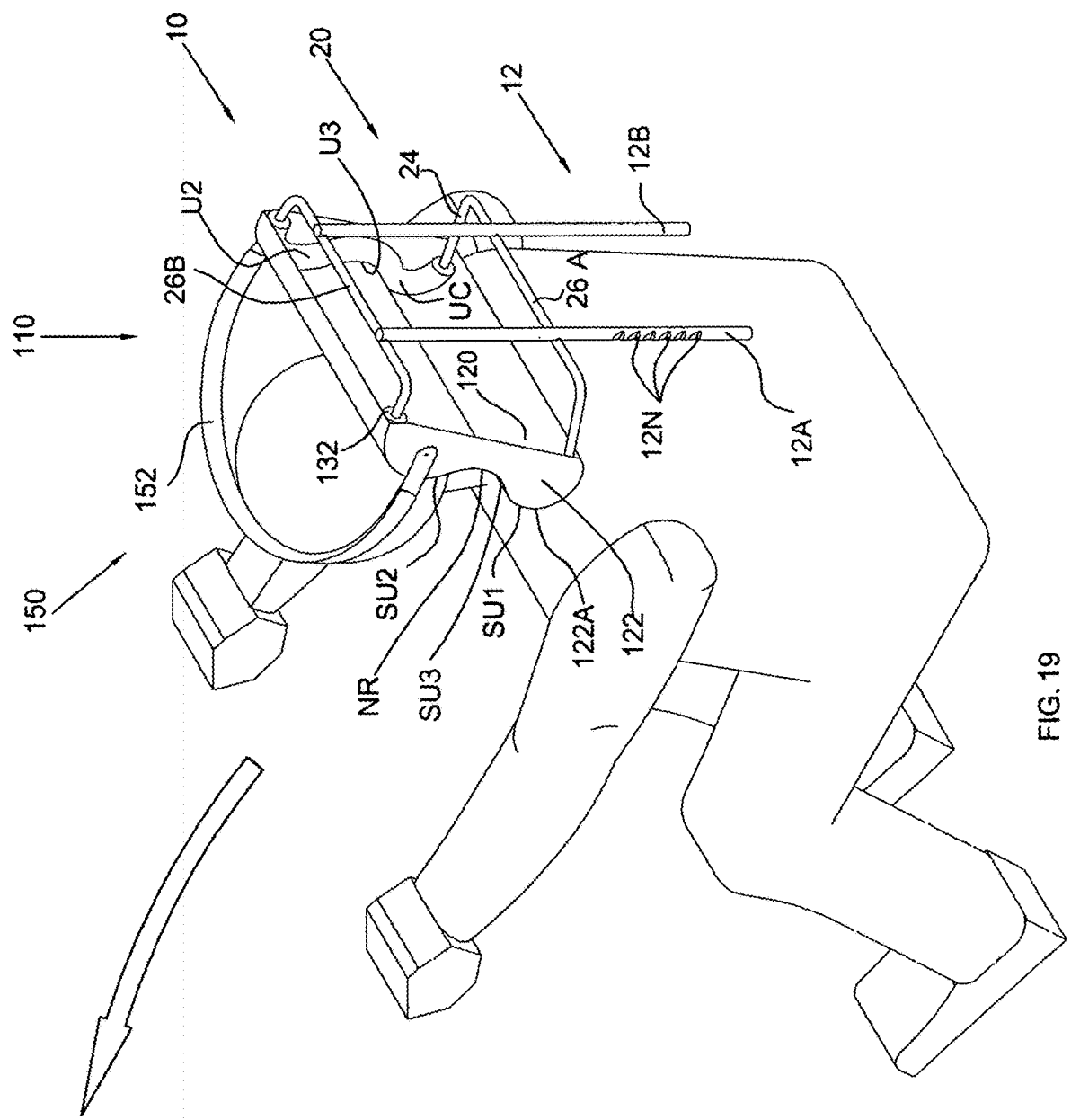
FIG. 19 is a view as in FIG. 18, illustrating the driver's head moving forward until it is stopped by touching the retaining barrier assembly.
Figure 20:
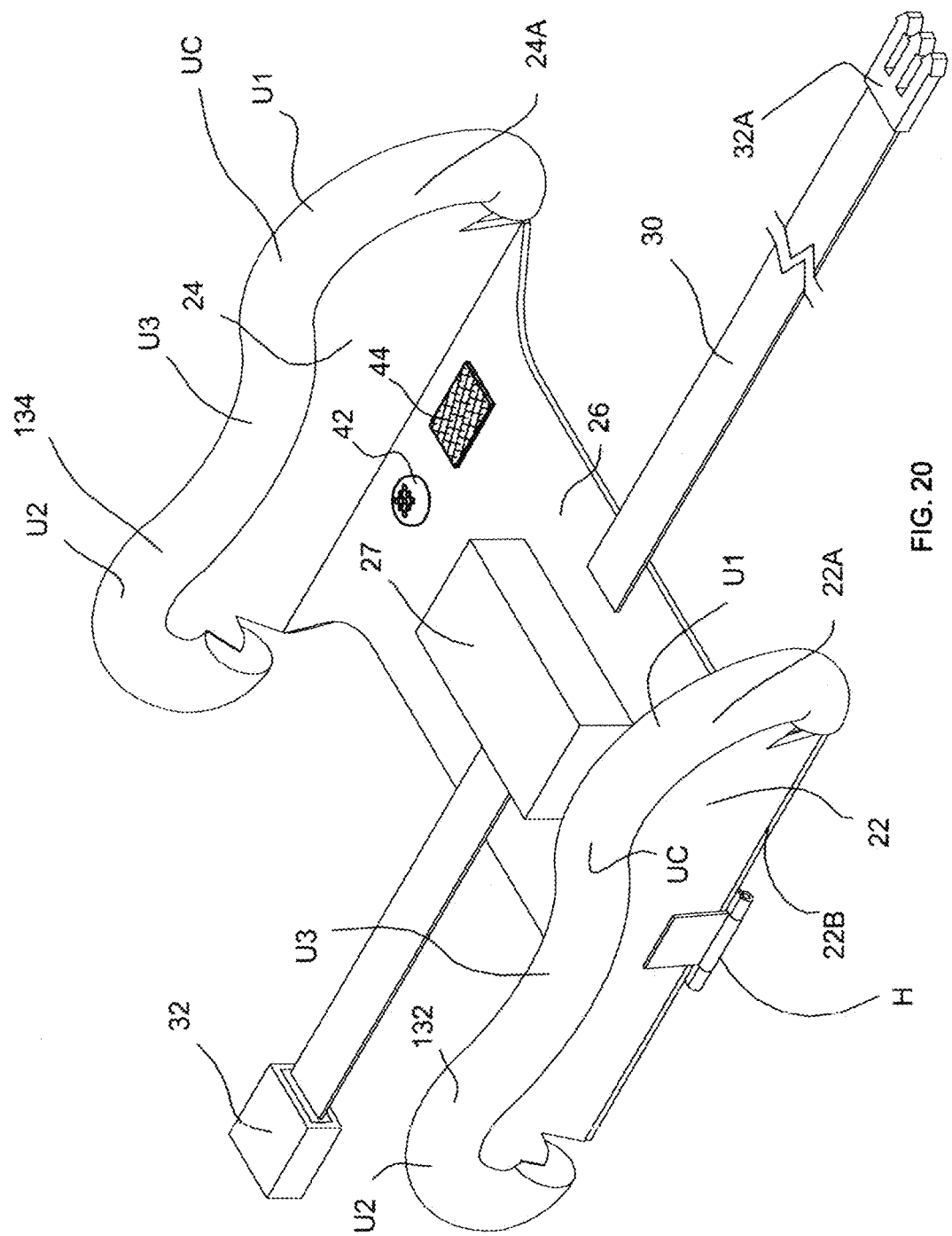
FIG. 20 is a view as in FIG. 6 with the sheet assembly removed to reveal parts behind it, including some parts of the drowsiness alarm system such as an alarm circuit board and mini buzzer.
Figure 21:
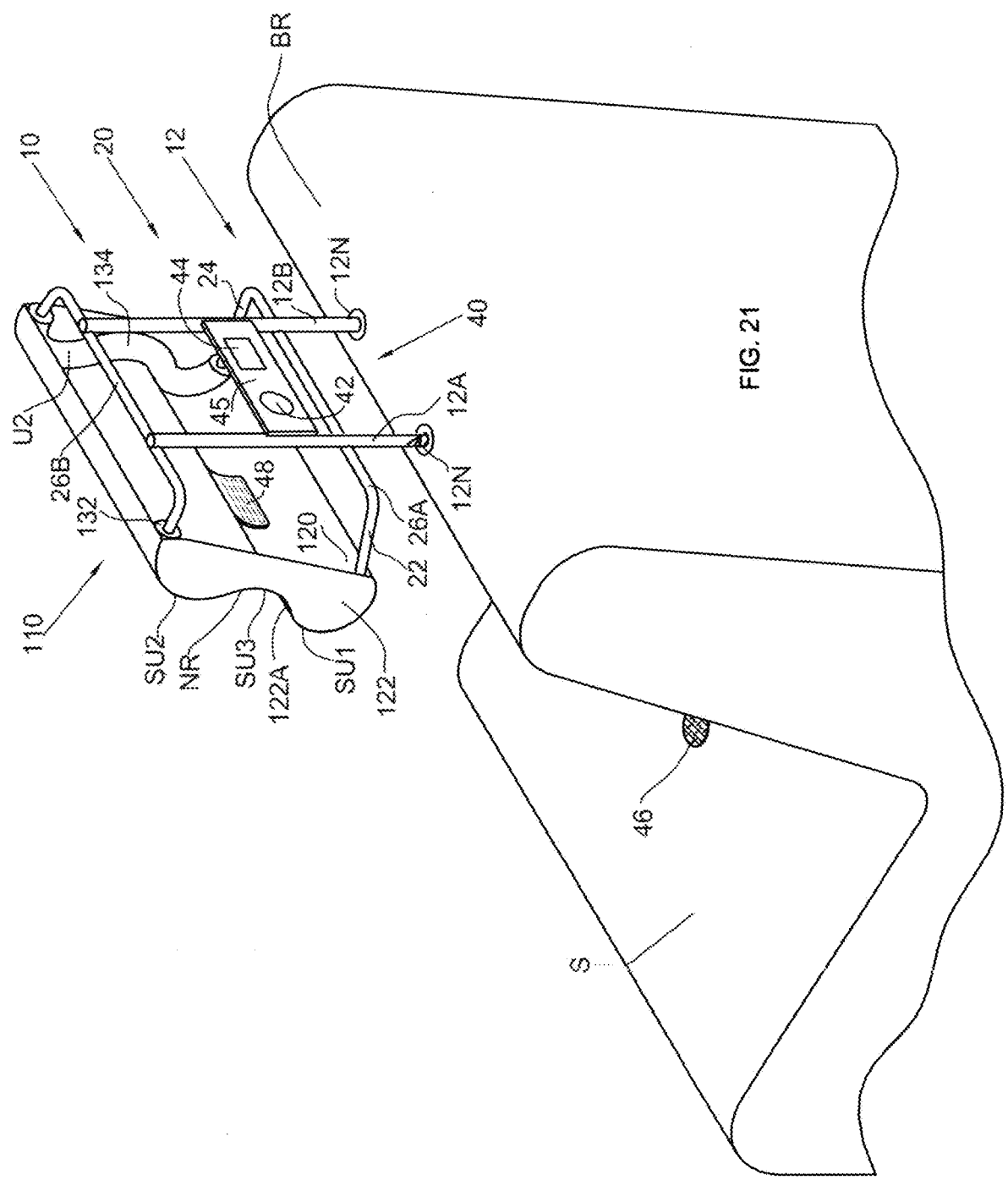
FIG. 21 is a rear perspective view of the apparatus installed on a backrest of a car seat, illustrating some parts of the drowsiness alarm system such as a seat pressure sensor, a sheet sensor, the alarm circuit board and the mini buzzer.
Figure 22:
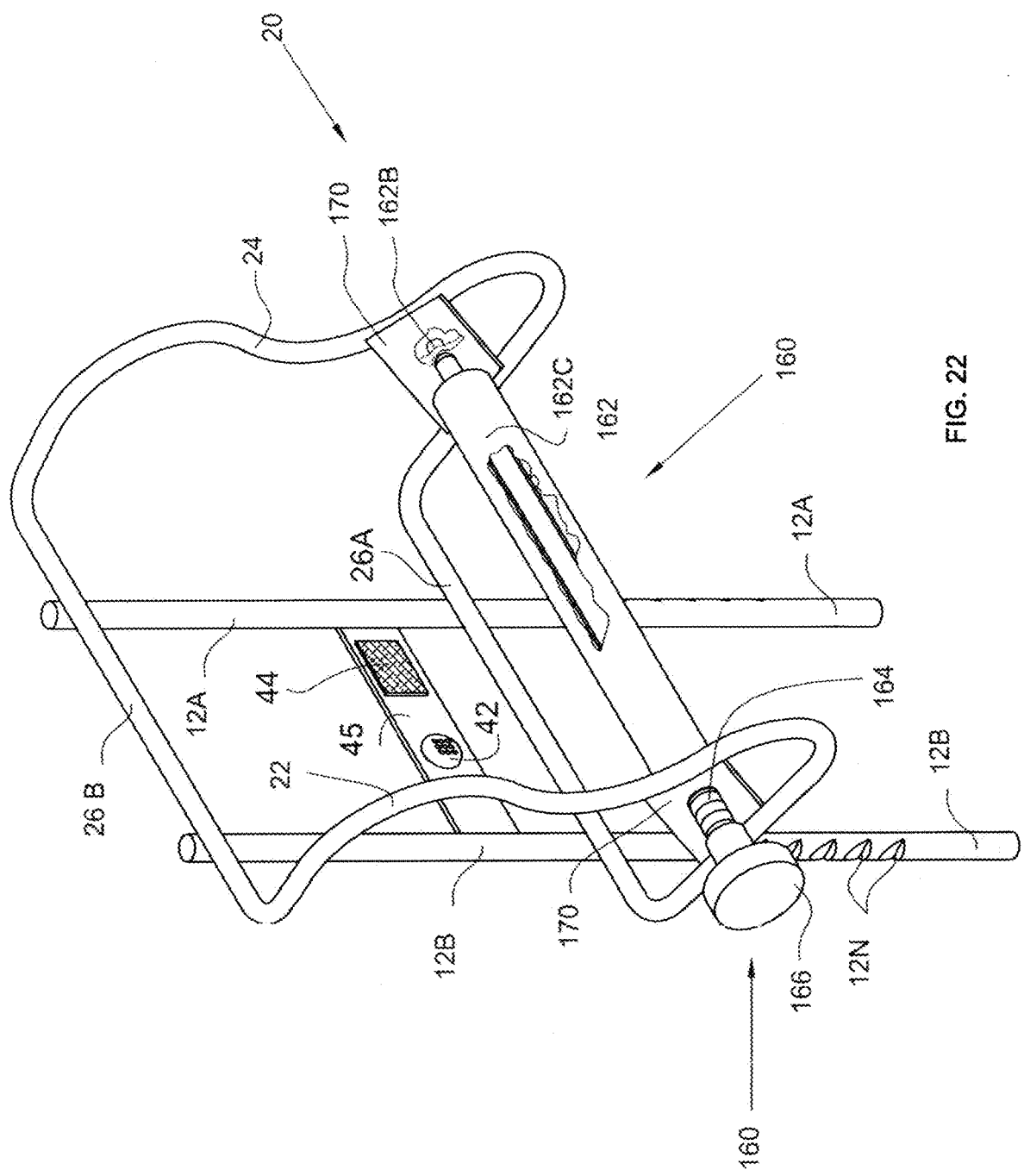
FIG. 22 is a view as in FIG. 5, with the sheet assembly removed to reveal the parts behind it, including some parts of the drowsiness alarm system such as the alarm circuit board and mini buzzer.
Figure 23:
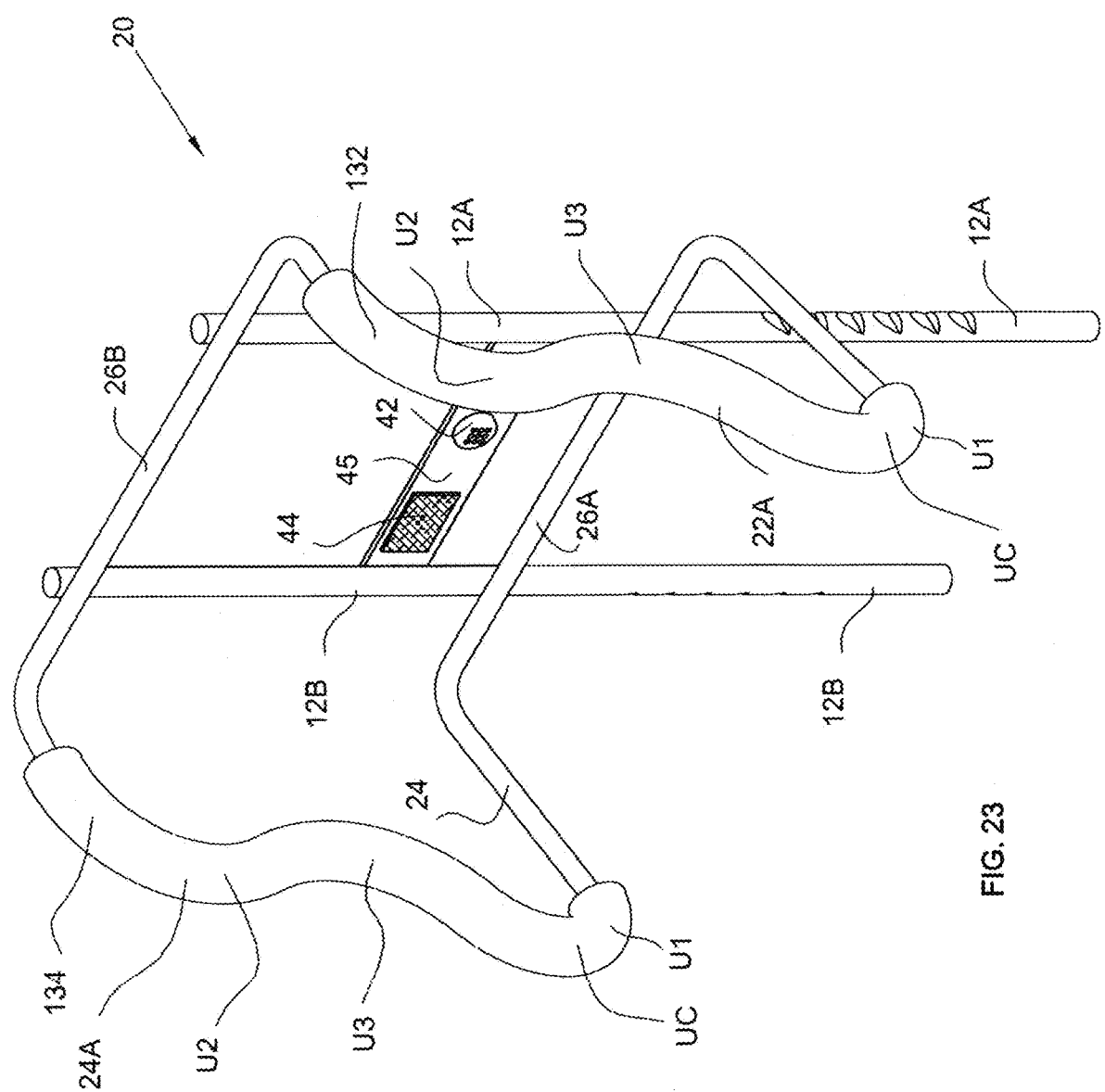
FIG. 23 is a view as in FIG. 1, again with the sheet assembly removed to reveal the parts behind it, including some parts of the drowsiness alarm system such as alarm circuit board and mini buzzer.
Figure 24:
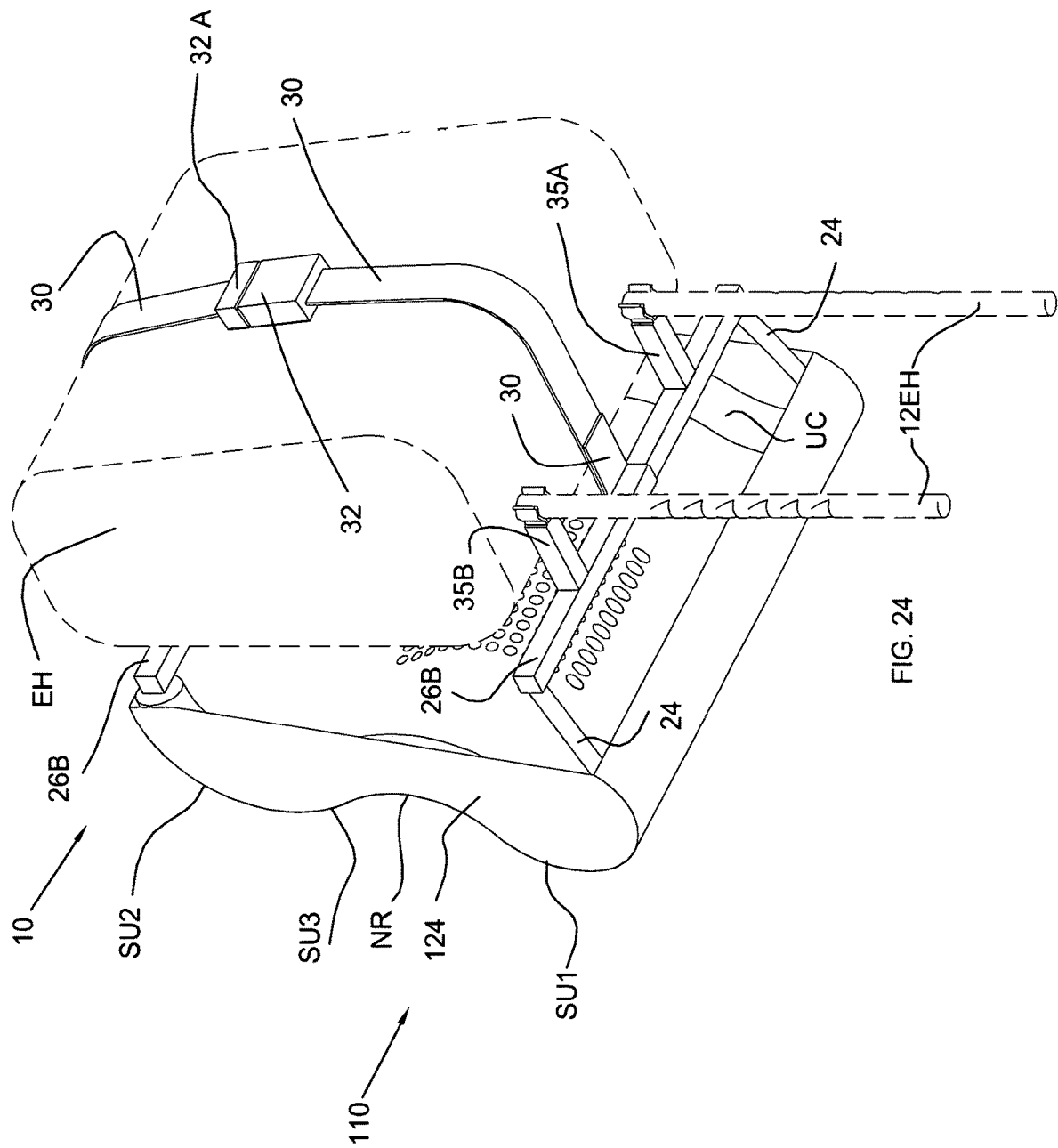
FIG. 24 is a rear perspective view of the apparatus secured to a headrest (shown in dashed lines) by grip clips and a mounting strap.
Figure 25:
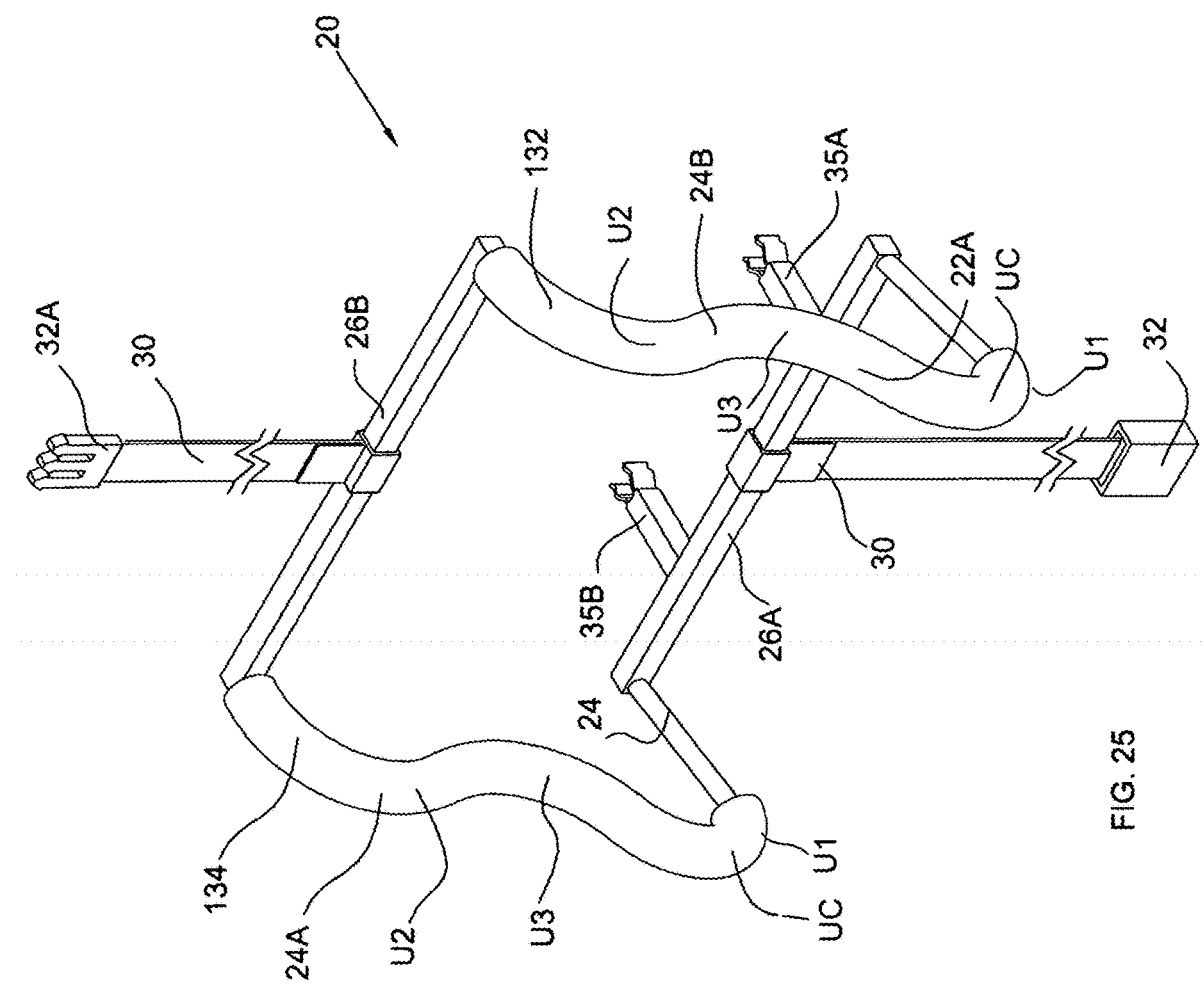
FIG. 25 is a view of the apparatus with the sheet assembly removed, again to reveal the parts behind it, such as grip clips and a mounting strap.
Figure 26:
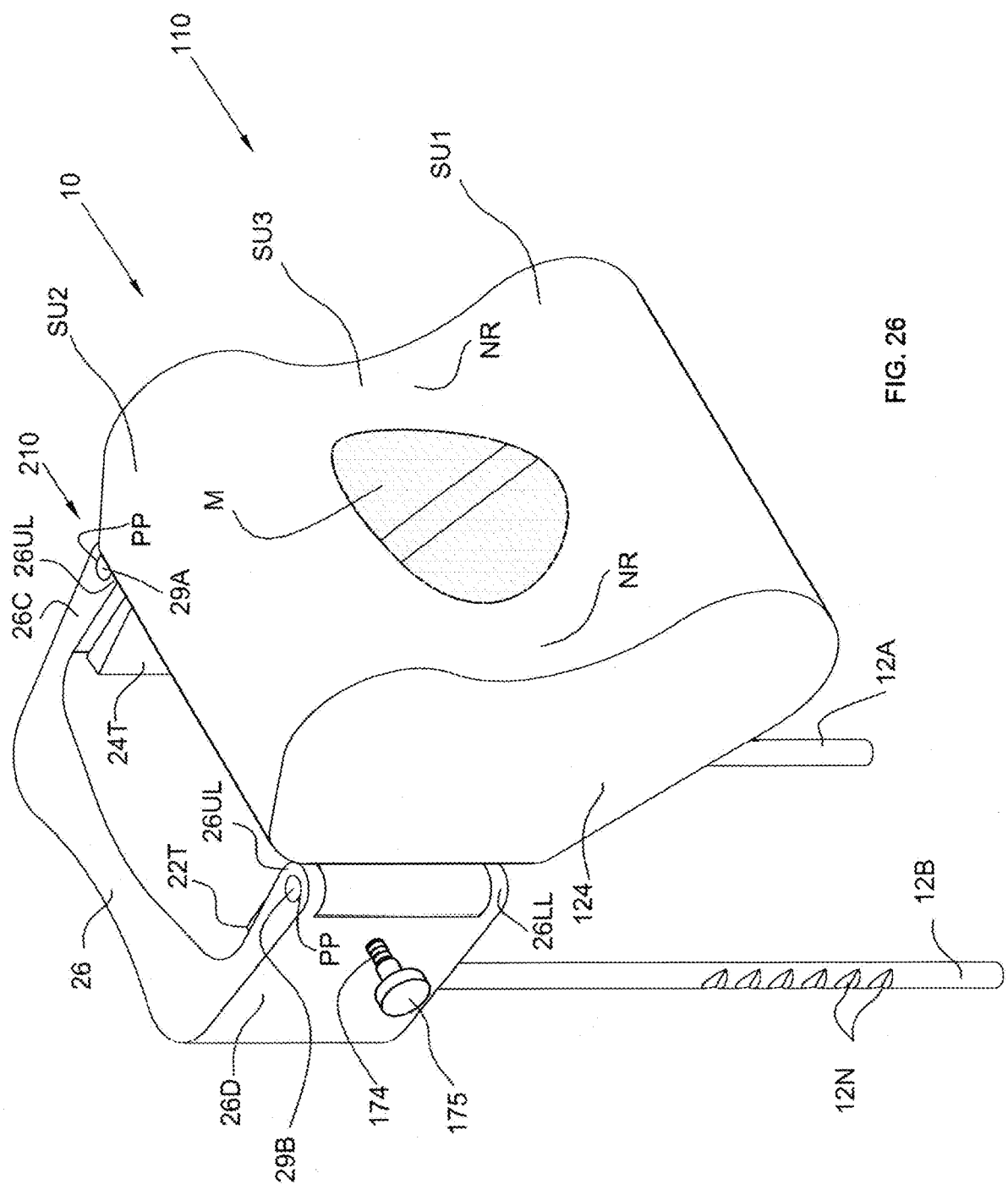
FIG. 26 is a front perspective view of the preferred embodiment of the apparatus having the screw-adjusted, second side frame spacing assembly.
Figure 27:
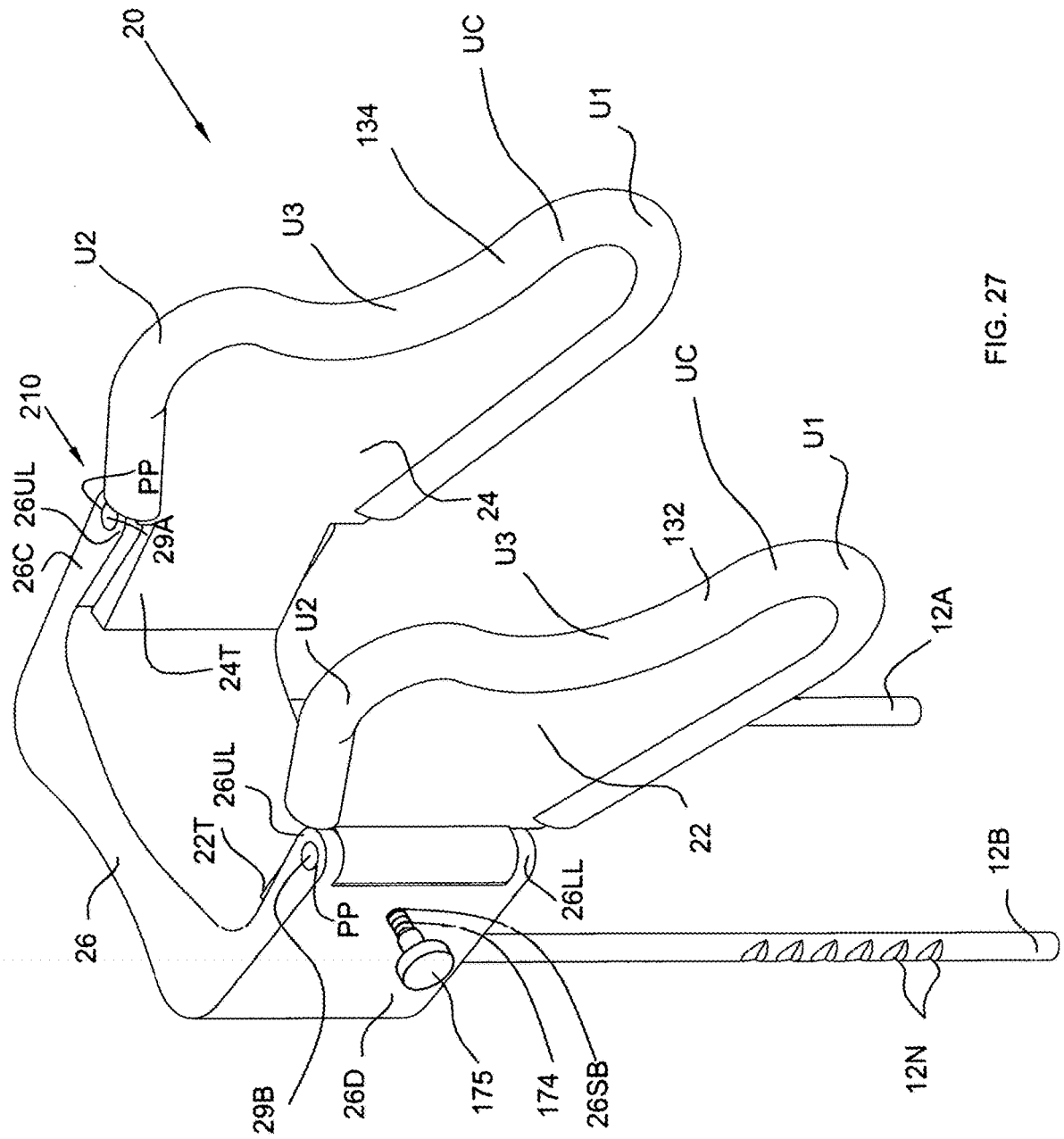
FIG. 27 is a view as in FIG. 26 with the sheet assembly removed.
Figure 28:
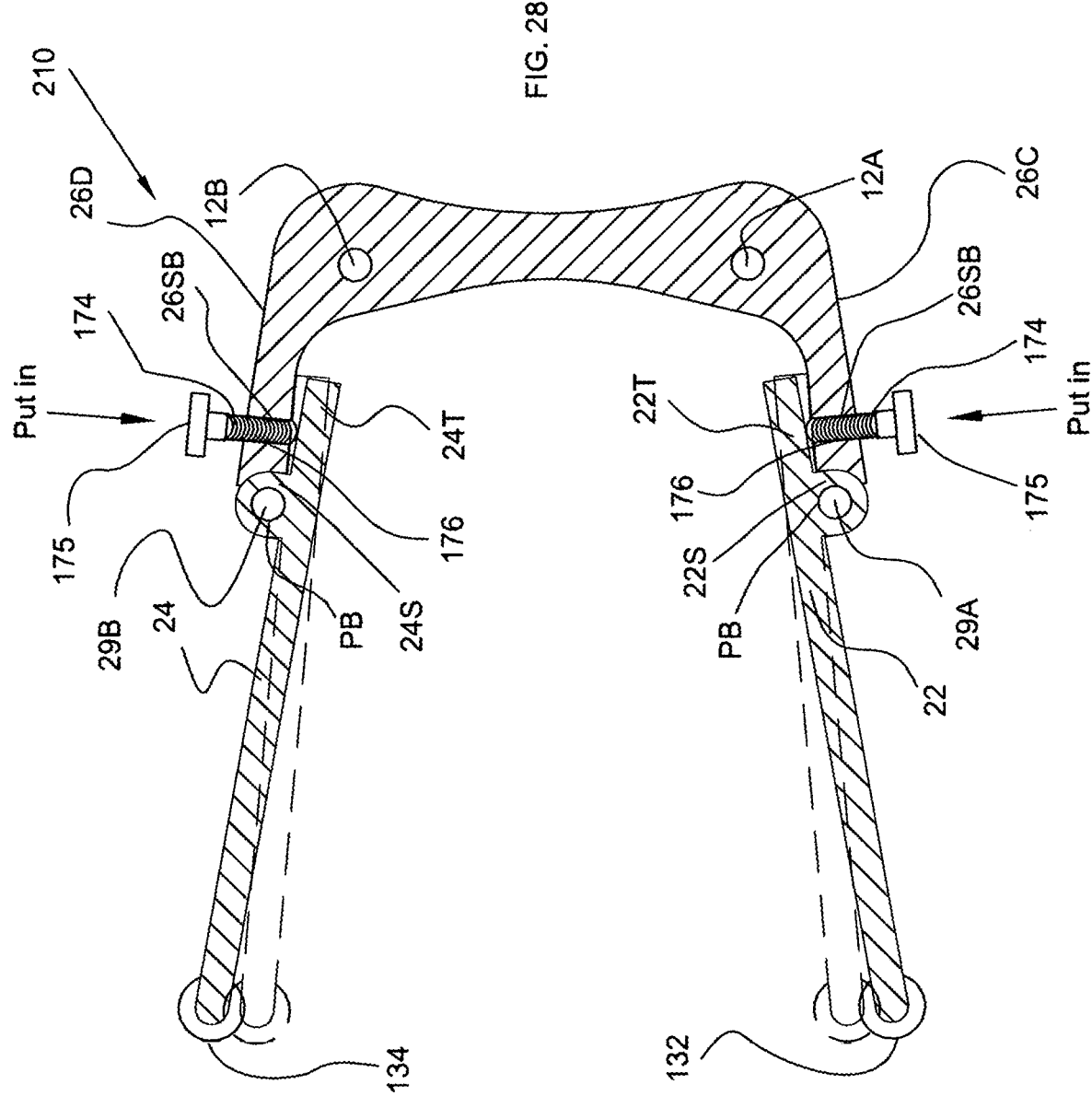
FIG. 28 is a top cross-sectional plan view of the apparatus of FIG. 26.
Figure 29:
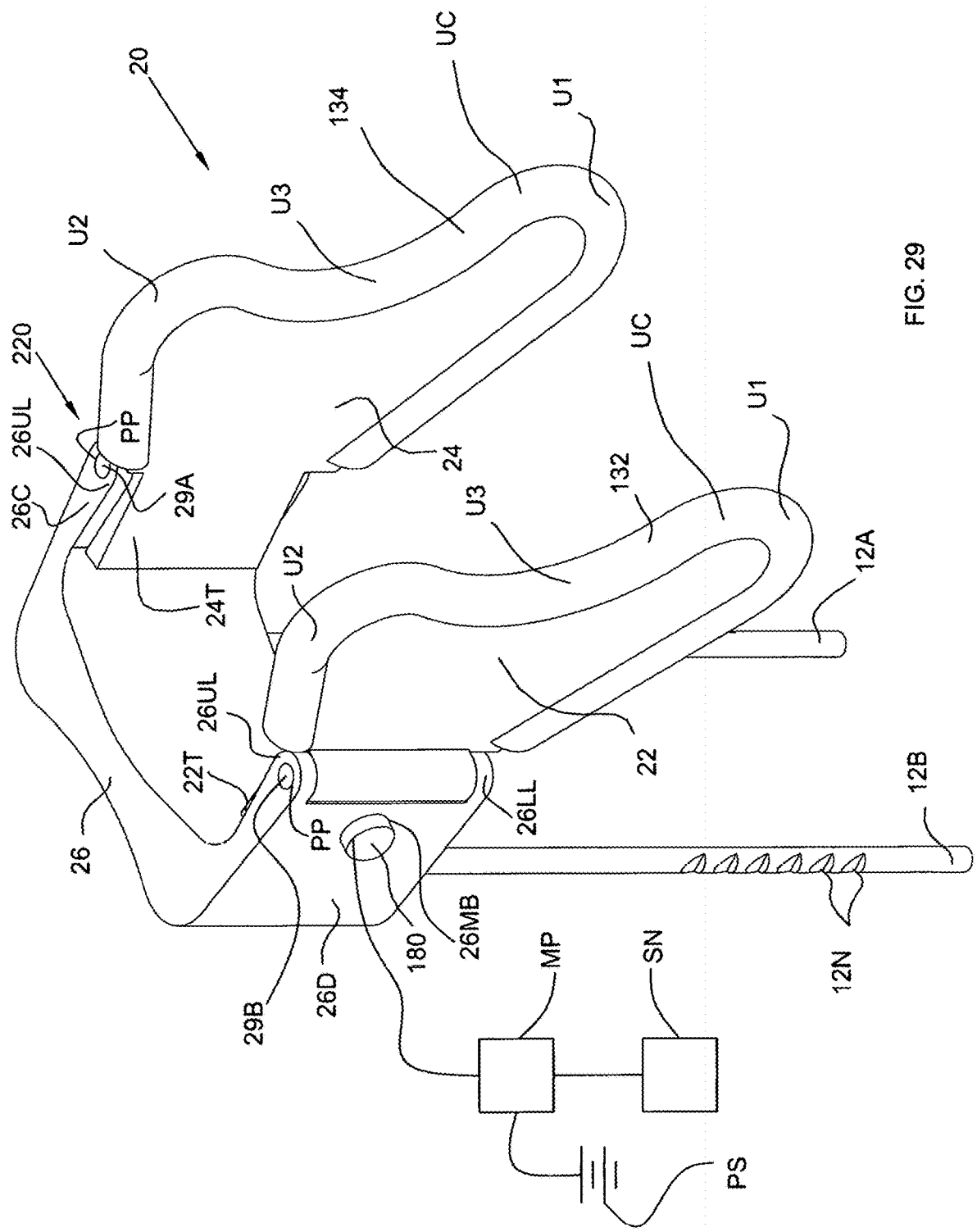
FIG. 29 is a front perspective view of the apparatus as in FIG. 26, having the solenoid-adjusted, third side frame spacing assembly.
Figure 30:
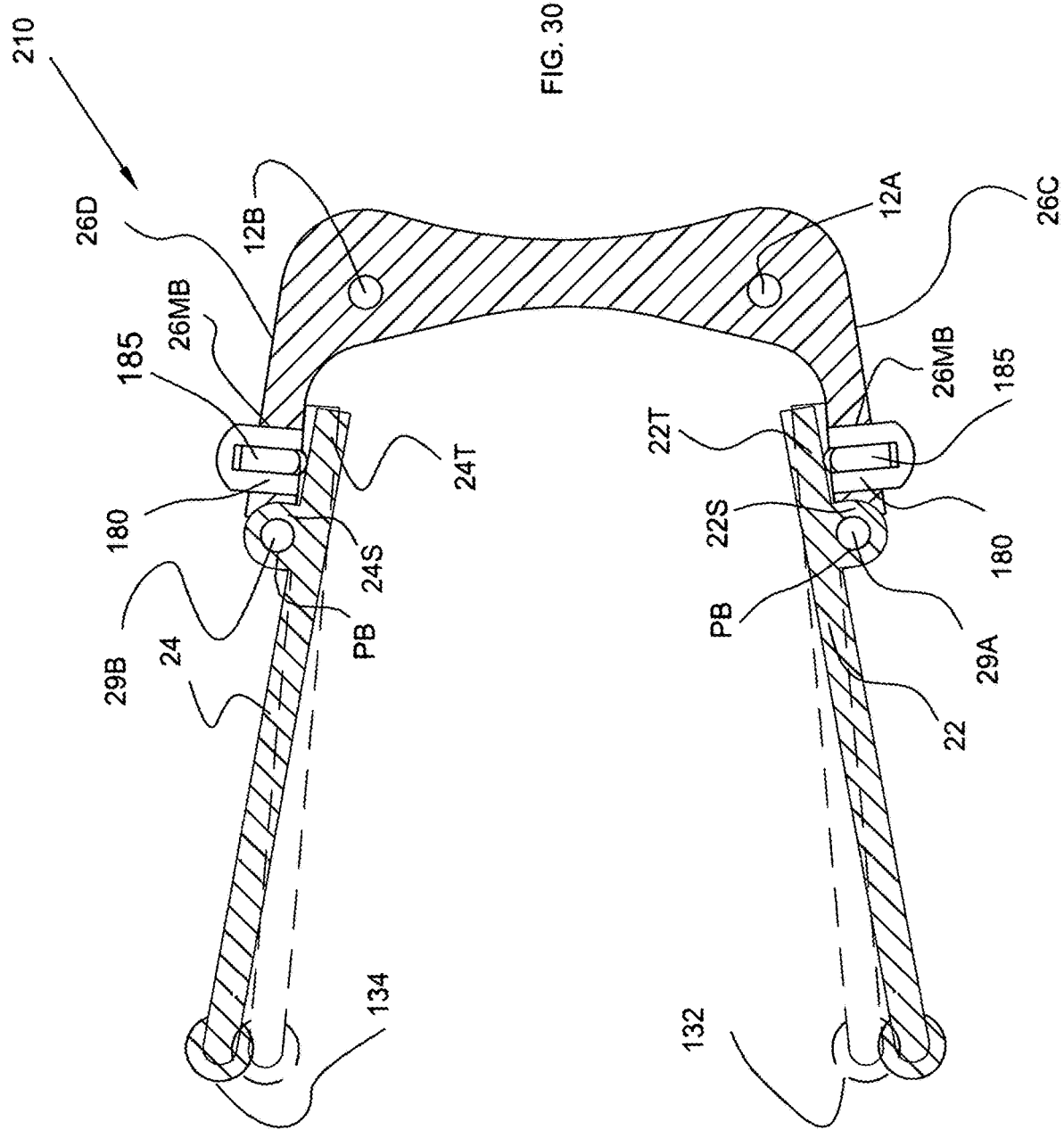
FIG. 30 is a top cross-sectional plan view of the apparatus of FIG. 29.

Referring to FIGS. 1-30, a headrest apparatus 10 is disclosed such as for mounting to the top of a backrest BR of a seat, such as a car seat, an office chair or a dental chair. The present headrest apparatus 10 includes a mounting structure 12 which preferably is upright for connecting to and extending upwardly from a seat backrest BR, and a headrest framework 20 secured to the upright mounting structure 12, the headrest framework 20 including a frame connecting structure 26 and generally parallel and spaced apart first and second side frames 22 and 24 extending forwardly from the frame connecting structure 26, and including an upright sheet assembly 110 fitted to and tautly suspended between and the first and second side frames 22 and 24 forwardly of the connecting structure 26, for supporting a user head H leaning back against the headrest apparatus 10.

The sheet assembly 110 preferably includes a sheet suspension portion 120 formed of a non-stretchable material for supporting a user head H and first and second side sheet assembly portions 122 and 124. The first and second sheet assembly side portions 122 and 124 preferably are also secured by corresponding hook and loop fastener strips (not shown) on the sheet assembly side portions and on the first and second side frames 22 and 24. The sheet assembly 110 may alternatively or additionally be secured by fasteners such as snap fasteners, pins or magnets (not shown).

The upright mounting structure 12 preferably includes two upright and laterally spaced apart support posts 12A and 12B. The connecting structure 26 preferably includes generally horizontal and spaced apart upper and lower connecting cross-members 26A and 26B, respectively, fastened to the support posts 12A and 12B, each of which curve forwardly and interconnect at their cross-member ends to form forwardly bowed member segments, thereby defining respectively the first and second side frames 22 and 24 at first and second cross-member ends. The cross-members 26A and 26B and support posts 12A and 12B preferably are hollow tubes to be light in weight and inexpensive to manufacture. The cross-members 26A and 26B preferably are resilient, and the side frames 22 and 24 preferably bow outwardly laterally a few degrees for engaging the sheet assembly 110. Post notch 12N are optionally provided to permit incremental apparatus 10 height adjustment relative to the seat backrest BR.

The sheet assembly 110 preferably includes a sheet suspension portion 120 for supporting a user head H, and first and second side frame engaging structures such as first and second sheet assembly side portions 122 and 124 extending rearwardly from the sheet suspension portion 120 which the outward surfaces OS of the side frames 22 and 24 are resiliently biased against, as noted above, so that the sheet assembly 110 is removably secured preferably by friction to the framework 20. A first cushion strip 132 preferably is glued onto the suspension sheet portion 120 adjacent to the first sheet assembly side portion 122 so that it extends over the first side frame forward surface 22A when mounted, and a second cushion strip 134 preferably is glued onto the sheet suspension portion 120 adjacent to the second sheet assembly side portion 124 so that it extends over the second side frame forward surface 24A to cushion the hard side frames 22 and 24. The first and second cushion strips 132 and 134 preferably are tubular to form cushion sleeves and sized to snugly and fit over side frame 22 and 24 member segments. The suspension sheet portion 120 optionally is perforated for ventilation, and circular perforations 140 preferably would be provided in rows to form a perforation grid G. There are circumstances where it may be preferred not to have such perforations 140. An example might be for a vehicle seat headrest 10 where wind from open vehicle windows can circulate to the rear of the passenger compartment and then forwardly through the perforations 140 against the user head and neck. On the other hand, such perforations 140 would be preferred for many non-vehicle chairs, such as office chairs.

To accommodate drivers' specific hair styles, for example a ponytail, the suspension sheet portion may have an optional opening in the area where driver's occiput is resting on the suspension sheet. The opening is preferably covered with an elastic mesh M to protect driver's hair getting inside of the headrest. See FIGS. 4, 5.

Alternatively, the side frames 22 and 24 are first and second side panels, and the connecting structure 26 is an interconnection panel 26 extending between and connected to the rearward ends of the first and second side panels 22 and 24. The side panels 22 and 24 are biased by side panel biasing means 28 so that the side panel forward ends 22A and 24A are biased several degrees apart from each other while remaining in generally forwardly extending positions, to pull the sheet suspension portion 120 taut.

To fit the sheet assembly 110 onto the headrest framework 20, one end is placed around the forward end of a corresponding side frame or side panel 22 and 24 so that the sheet assembly side portion abuts the outward side surface of the side frame or panel 22 and 24, and then the side frames or panels 22 and 24 are pivoted a few degrees toward each other to become substantially parallel, so that the other end of the sheet assembly 110 can be fitted around the side frames or side panels 22 and 24. Then the side frames 22 and 24 are released so that the biasing means 28 pull the sheet suspension portion 120 taut.

For one embodiment, the side panels 22 and 24 are fixedly attached to the interconnection panel 26, preferably at opposing interconnection panel 26 ends. The side panels 22 and 24 and the interconnection panel 26 are formed of a resilient material such as a suitable plastic sheet, so that the side panels 22 and 24 spring back to their original positions when bent, and therefore function as the side panel biasing means 28. Alternatively, the side panels 22 and 24 are separate pieces which are mounted to the interconnection panel 26 with hinges H, and springs SP bias the side panels 22 and 24 outwardly relative to the interconnection panel 26 to upright positions. A panel stop (not shown) preferably is provided for each panel 22 and 24, and the panel springs SP can be positioned to press in only the panel outward pivot direction until the given panel 22 or 24 abuts the stop.

The side frame forward surfaces 22A and 24A, or side panel forward edges, preferably are configured to follow a smooth undulating curve UC with forward panel curves U1 and U2 at the and at the lower and upper ends of each side frame or panel 22 and 24, separated by a curve U3. The sheet assembly first and second assembly side portions 122 and 124 preferably have undulations along their forward ends matching the undulations of the respective adjacent first and second side frames or panels 22 and 24, so generally to include a forward and a rearward sheet curves SU1-SU3. The forward lower sheet curve SU1 of the sheet suspension portion 120 fits into a user neck, the rearward middle sheet curve SU3 forms a nesting region NR for the user head HD and the rearward middle sheet curve SU3 retains the user head H in the headrest apparatus 10. A key inventive feature of the headrest apparatus 10 is that the sheet assembly 110 is pulled most taut by the frame or panel biasing means 28 along the forward most segments of the side frames 22 and 24 because they are at the greatest radial distance from the frame or panel pivot lines L. As a result, the sheet assembly 110 is most firm and taut along the forward lower sheet curve SU1 to support the user neck, and along the forward upper sheet curve SU2 to firmly retain the user head HD in the nesting region NR. The rearward middle panel curve U3 by the same token is less taut and firm, to more comfortably cushion a user head HD. While these undulations are preferred, providing side frame or side panel forward surfaces 22A and 24A with differently shaped and sequenced curves U1, U2 and U3 is contemplated to produce other sheet assembly undulations and therefore other support characteristics.

The backrest apparatus 10 can be mounted to the top of a backrest BR of a seat S using the upright mounting structure 12 as described above, and alternatively can be mounted to the front of an existing headrest using a mounting strap 30. See FIG. 6. The mounting strap 30 is anchored to the framework 20 and has a first mounting strap end 30A fitted with a mounting buckle 32, and a second mounting strap end 30B having a buckle insert 32A which fits into and is removably secured within the mounting buckle 32 after the mounting strap 30 is wrapped around the existing headrest EH. Then the second strap mounting end 30B is pulled tight through the mounting buckle 32. A caution block 27 is optionally provided and preferably mounted to an inward side of the interconnection panel 26 to protect a driver's head HI) from accidental rough contact with the interconnection panel 26 at time of crash. See FIG. 7.

Still another alternative and optional way to mount the headrest apparatus 10 to the front of the car seat S existing headrest EH is by grip clips 35A and 35B preferably mounted on the lower connecting cross-member 26B of the backrest apparatus 10 which tightly grip upright mounting structures 12EH of the existing headrest. Optionally, a mounting strap 30 also may be used to reinforce the connection. See FIGS. 24 and 25.

An additional and optional feature of the headrest apparatus 10 is a head retaining barrier assembly 150 for retaining the head against substantial forward movement relative to the driver's torso. The head retaining barrier assembly 150 includes a resilient head retaining barrier 152 in preferably the form of a flexible strip preferable made as a plastic strip or tube, a first end of which is pivotally secured such as with a rivet 154A to the first side frame 22 and a second end of which is pivotally secured such as with a rivet 154B to the second side frame 24. The head retaining barrier 152 is elevated above the user head HD as the user sits in the driver seat S, and then is manually pulled down to extend around the user forehead. The retaining barrier 152 may be maintained at its given elevation at which the user leaves it, whether elevated above the user head HD or lowered to pass in front of the user forehead, by friction between the barrier ends and the rivets 154 and 154A. Alternatively, a barrier retaining mechanism 150 may be provided for the barrier ends 152A and 152B are rounded and each includes a series of peripheral notches 156N. A position anchoring pawl member 158 in the form of a spring 158A mounted to a pawl rivet 158P in the framework 20 releasably holds the retaining barrier 152 in a selected pivoted position relative to the user head HD. See FIG. 15.

A side frame spacing assembly 160 is optionally provided for bowing the first and second side frames 22 and 24, respectively, away from each other to adjust the tightness and firmness of the sheet suspension portion 120. The assembly 160 includes a drive screw rod 162 engagingly passing through a threaded screw port 164 in either the first or the second side frame 22 or 24 so that a first end of the drive screw 162 protrudes outwardly from the frame 20. A screw knob 166 is fixedly secured to the protruding drive rod first end 162A for a user to grip and rotate the drive rod 162, while the drive screw second end 162B bears against the opposing side frame 24 or 22. Drive rod 162 optionally passes through a cushion sleeve 162C to protect driver's head HD from accidental rough contact with the drive screw 162 at the time of the crash. See FIG. 7. A drive screw abutment plate 170 preferably is provided for the drive screw second end 162B to bear against, and a drive screw mounting plate 172 preferably is provided through which the threaded screw port 164 passes. See FIGS. 5, 6, 7, 9, 13 and 14.

A second side frame spacing assembly 210 is optionally provided, for moving the first and second side frames 22 and 24 toward and away from each other to adjust the tightness of the sheet suspension portion 120 for user safety and comfort. See FIGS. 26-28. Elements of spacing assembly 210 are a base 26 having integral and forwardly extending base first and second side portions 26C and 26D, respectively. Side frames 22 and 24 are provided which are separate from base 26. Base first and second side portions 26C and 26D each have a vertical hinge notch in their forward ends defining forwardly protruding upper and lower hinge lobes 26UL and 26LL, which include registering vertical pin ports PP. Side frames 22 and 24 each have a rearwardly extending vertical frame hinge segment 22S and 24S, respectively, having a vertical pin bore PB which are recessed at their upper and lower ends to fit between respective sets of upper and lower hinge lobes 26UL and 26LL. Hinge segments 22S and 24S are positioned between respective sets of upper and lower hinge lobes 26UL and 26LL so that pin ports PP and pin bore PB register. Frame pins 29A and 29B are fitted through hinge lobes 26UL and 26LL and the corresponding hinge segment 22S or 24S, so that hinges are formed and side frames 22 and 24 are thereby pivotally connected to first and second base side portions 26C and 26D. The assembly 210 further includes horizontal threaded screw bores 26SB passing respectively through base first and second side portions 26C and 26D and positioned to align with inside tab portions 22T and 24T. A tensioning screw 174 with a screw knob 175 for easy manual gripping is engagingly fitted into each screw bore 26SB. As a result, each a tensioning screw 174 can be rotated and thereby advanced into abutting contact with each inside tab portion 22T and 24T and displace the tab portion 22T and 24T and thereby pivot side frames 22 and 24 outwardly, to increase tension in the sheet suspension portion 120. Alternatively, tensioning screws 174 can be rotated in the opposing direction to retract screws 174 away from inside tab portions 22T and 24T, and thereby decrease tension in the sheet suspension portion 120.

A third side frame spacing assembly 220 is further optionally provided which automatically tensions the sheet suspension portion 120 in response to a crash impact. See FIGS. 29 and 30. For this version, the base 26 and side frames 22 and 24 are the same as for the second side frame spacing assembly 210. However, threaded screw bores 26SB are replaced with similarly located solenoid mounting bores 26MB into which solenoids 180 containing plungers 185 are fitted and secured, and oriented so that the plunger 185 is displaced by the solenoid 180 toward and against the respective inside tab portion 22T or 24T. As a result, the plungers 185 displace tab portions 22T and 24T and increase tension in the sheet suspension portion 120 in proportion to the magnitude of electric current passed through the solenoids 180 from power source PS. Sensors SN mounted in the vehicle detect the location and force of crash impact on the vehicle and deliver this information to a microprocessor MP which controls the magnitude of electric current delivered to the solenoids 180 and thus the amount of tension in the sheet suspension portion 120 immediately following a crash to most advantageously and safely support the user head H in response. It is primarily contemplated that side frame spacing assemblies 160, 210 and 220 be provided as alternatives, but it is also contemplated that either two or all three of them be provided in combination in a single headrest apparatus 10.

Activated by user a drowsiness alarm system 40 preferably is provided as optional part of the headrest apparatus 10, to wake and alert a driver if he or she begins to fall asleep while driving. The alarm system 40 includes a sound generating alarm 42, an alarm circuit 44 having a seat pressure sensor 46 mounted in the driver seat to detect when a user is seated, and a sheet sensor which is preferably a pressure sensor. The sheet sensor 48 is preferably mounted to the inner side of the sheet suspension portion 120 or in a side frame or side panel 22 or 24 to detect when a user head HD is resting against the sheet assembly 110. When the sheet sensor 48 detects that the user head HD is tilting forward and no longer resting against the sheet suspension portion 120, and the seat sensor 46 detects that a person is still resting on the seat, the alarm circuit 44 sends an electric signal to the sound generating alarm 42 to wake a driver who has begun to fall asleep. The sound generating alarm 42 preferably is a small electronic buzzer installed on the abutment plate 45 of the headrest framework 20 or on the interconnection panel 26. See FIGS. 20, 21, 22, 23.

A sheet assembly vibration mechanism 50 is preferably provided to deliver soothing vibration to the sheet assembly 110, which in turn radiates vibration to the user head and neck to ease pain and discomfort such as may be caused by strained neck or shoulder muscles. A preferred vibration mechanism 50 includes an electric mini vibration motor 72 mounted preferably to the one or both side panels 22 and 24 or on outward platform portion 26P. The motor 72 is activated and deactivated by the user. See FIGS. 7, 13 and 14.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A headrest apparatus, comprising:
an apparatus mounting structure for connecting said apparatus to a seat backrest;
a headrest framework secured to said mounting structure, said headrest framework comprising a frame connecting structure, and and spaced apart first and second side frames extending forwardly from said frame connecting structure, said first side frame having a first side frame forward surface and said second side frame having a second side frame forward surface;
and an upright sheet assembly fitted to and suspended between said first and second side frames forwardly of said connecting structure, for supporting a user head leaning back against said headrest apparatus; wherein said sheet assembly interconnects said first and second side frame forward surfaces and said first and second side frames are pivotally connected to said frame connecting structure by respective first and second pivot connections, said first and second side frames being engaged on a rearward side of each of said pivot connections by a retractable member, such that protraction of said retractable members causes the forward surfaces of said first and second side frames to move apart from each other on a forward side of said pivot connections, such that said sheet assembly becomes more taut.

2. The headrest apparatus of claim 1, wherein said sheet assembly comprises a sheet suspension portion formed of a substantially non-stretchable material for supporting a user head and first and second side sheet assembly side portions.

3. The headrest apparatus of claim 1, wherein said mounting structure comprises two upright and laterally spaced apart support posts, and said connecting structure comprises generally horizontal and spaced apart upper and lower connecting cross-members fastened to said support posts and each curving forwardly and having first and second cross-member ends which interconnect to form forwardly bowed member segments, thereby defining respectively said first and second side frames at said first and second cross-member ends.

4. The headrest apparatus of claim 3, wherein said cross-members and said support posts are hollow tubes and are resilient.

5. The headrest apparatus of claim 1, wherein said side frames bow laterally outwardly a few degrees for engaging said sheet assembly.

6. The headrest apparatus of claim 3, comprising a vertical series of notches in each of said support posts and notch engaging means to permit incremental apparatus height adjustment relative to a seat backrest.

7. The headrest apparatus of claim 1, wherein said sheet assembly comprises a sheet suspension portion for supporting a user head, and first and second side frame engaging structures.

8. The headrest apparatus of claim 7, wherein said side frame engaging structures are first and second sheet assembly side portions extending rearwardly from said sheet suspension portion against which the outward surfaces of said first and second side frames are resiliently biased, such that said sheet assembly is removably secured with friction engagement to said framework.

9. The headrest apparatus of claim 2, wherein a first cushion strip is fastened onto said suspension sheet portion adjacent to said first sheet assembly side portion such that said first cushion strip extends over said first side frame forward surface when mounted, and a second cushion strip is fastened onto said sheet suspension portion adjacent to said second sheet assembly side portion, such that said second cushion strip extends over said second side frame forward surface to cushion said side frames.

10. The headrest apparatus of claim 2, wherein said sheet suspension portion comprises at least one perforation for passing air to a user head for ventilation and cooling.

11. The headrest apparatus of claim 10, wherein said suspension sheet portion comprises a plurality of said perforations.

12. The headrest apparatus of claim 2, wherein said first and second side frame forward surfaces are configured to follow a substantially smooth undulating curve with forward panel curves at the lower and upper ends of each side frame, separated by a rearward curve, and said sheet assembly first and second assembly side portions have undulations along their forward ends substantially matching the undulations of the respective and adjacent said first and second side frames, such as to produce corresponding upper and lower forward sheet curves and rearward sheet curves, wherein a forward lower sheet curve of said sheet suspension portion are sized, shaped to fit into a user neck, and a rearward middle sheet curve forms a nesting region for a user head and said rearward middle sheet curve forms a retaining portion for a user head.

13. The headrest apparatus of claim 2, wherein said first side frame has a rearwardly extending frame hinge segment with a substantially vertical pin bore which is recessed at its upper and lower ends to fit between a first set of spaced apart upper and lower hinge lobes, and said second side frame has a rearwardly extending substantially vertical frame hinge segment having a substantially vertical pin bore which is recessed at its upper and lower ends to fit between a second set of upper and lower hinge lobes, each of said frame hinge segments being positioned respectively between said sets of said upper and lower hinge lobes such that said pin ports and said pin bores register, and frame pins extend through hinge lobes and the corresponding said hinge segment, such that first and second frame hinges are formed and said side frames are thereby pivotally connected to said first and second base side portions, wherein said first side frame includes a first tab portion extending rearwardly from said first frame hinge and said second side frame includes a second tab portion extending rearwardly from said second frame hinge;

wherein said assembly further comprises a side frame spacing assembly including substantially horizontal threaded screw bores passing respectively through said base first and second side portions and positioned to align with said inside tab portions, and one of the retractable members in the form of a tensioning screw is engagingly fitted into each said screw bore, such that one of said tensioning screws can be rotated in a first direction and thereby advanced into abutting contact with a corresponding said inside tab portion and displace said inside tab portion and thereby pivot the corresponding said side frame outwardly, to increase tension in said sheet suspension portion, and wherein said tensioning screws can be rotated in an opposing direction to retract said tensioning screws away from said inside tab portions, thereby decreasing tension in said sheet suspension portion.

14. The headrest apparatus of claim 2, wherein said first side frame has a rearwardly extending frame hinge segment with a substantially vertical pin bore which is recessed at its upper and lower ends to fit between a first set of spaced apart upper and lower hinge lobes, and said second side frame has a rearwardly extending substantially vertical frame hinge segment having a substantially vertical pin bore which is recessed at its upper and lower ends to fit between a second set of upper and lower hinge lobes, each of said frame hinge segments being positioned respectively between said sets of said upper and lower hinge lobes such that said pin ports and said pin bores register, and frame pins extend through hinge lobes and the corresponding said hinge segment, such that first and second frame hinges are formed and said side frames are thereby pivotally connected to said first and second base side portions, wherein said first side frame includes a first tab portion extending rearwardly from said first frame hinge and said second side frame includes a second tab portion extending rearwardly from said second frame hinge;

additionally comprising a side frame spacing assembly for automatically tensioning said sheet suspension portion in response to a crash impact, including a first solenoid mounting bore in said first side frame and a second solenoid mounting bore in said second side frame, and a first solenoid with one of the retractable members in the form of a plunger mounted in said first solenoid mounting bore and a second solenoid with another of the retractable members in the form of another plunger mounted in said second solenoid mounting bore, said solenoids being oriented such that each said plunger can be displaced by a corresponding said solenoid toward and against a respective inside tab portion;

such that said plungers displace said inside tab portions toward each other to increase tension in said sheet suspension portion in proportion to the magnitude of electric current passed through said solenoids from a power source, wherein sensors mounted in the vehicle detect the location and force of a crash impact on the vehicle and deliver this information to a microprocessor which controls the magnitude of electric current delivered to said solenoids and thus the amount of tension they create in the sheet suspension portion immediately subsequent to a crash, safely supporting a user head.

15. The headrest apparatus of claim 2, additionally comprising a drowsiness alarm system for waking and alerting a driver in the event that he or she begins to fall asleep while driving, said alarm system comprising an alarm circuit including an alarm device, a seat pressure sensor mounted in a driver seat to detect when a user is seated, a sheet sensor mounted to one of said sheet assembly and said first side frame and said second side frame to detect when a user head is resting against said sheet assembly;

such that when said sheet sensor detects that a user head is no longer resting against said sheet suspension portion, and said seat sensor detects that a person is still resting on the seat, said alarm circuit sends an electric signal to said sound generating alarm to activate said sound generating alarm to wake a driver.

16. The headrest apparatus of claim 1, additionally comprising a sheet assembly vibration mechanism for delivering vibration to said sheet assembly, which radiates vibration to a user head and neck to ease pain and discomfort, said vibration mechanism comprising an electric vibration motor mounted to said headrest framework.

17. The headrest apparatus of claim 1, wherein said first and second side frames are resilient to accommodate increased sheet assembly tautness.

* * * * *